US012756806B2

(12) United States Patent
Miyamoto

(10) Patent No.: US 12,756,806 B2
(45) Date of Patent: Oct. 6, 2026

(54) PROJECTOR, CONTROL METHOD FOR PROJECTOR, AND NON-TRANSITORY COMPUTER-READABLE STORAGE MEDIUM STORING PROGRAM

(71) Applicant: SEIKO EPSON CORPORATION, Tokyo (JP)

(72) Inventor: Masataka Miyamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 278 days.

(21) Appl. No.: 18/599,491

(22) Filed: Mar. 8, 2024

(65) Prior Publication Data

US 2024/0305758 A1 Sep. 12, 2024

(30) Foreign Application Priority Data

Mar. 8, 2023 (JP) ................................ 2023-035338

(51) Int. Cl.
*G06F 3/01* (2006.01)
*H04N 9/31* (2006.01)

(52) U.S. Cl.
CPC ................................ *H04N 9/3188* (2013.01)

(58) Field of Classification Search
CPC .......................... H04N 9/3188; H04N 9/3185
See application file for complete search history.

(56) References Cited

U.S. PATENT DOCUMENTS

2012/0069180 A1* 3/2012 Kawamura ............ G09G 3/002 353/7
2012/0218524 A1* 8/2012 Chuang ................ H04N 9/3185 353/121
2016/0091987 A1* 3/2016 Kamiya ............... H04N 9/3185 345/157
2017/0264873 A1* 9/2017 Muramatsu .......... H04N 9/3194
2020/0177854 A1* 6/2020 Miao .................... H04N 9/3185
2021/0235051 A1* 7/2021 Tsukagoshi .......... G03B 21/208
2022/0101553 A1* 3/2022 Konno .................. G06T 7/0012
2022/0385867 A1* 12/2022 Kim ......................... H04N 9/31
2023/0010713 A1* 1/2023 Park ........................ G01S 17/88
2023/0037686 A1* 2/2023 Choi .................... G03B 21/147
2023/0300306 A1* 9/2023 Aoki ......................... G06T 3/40 348/135

FOREIGN PATENT DOCUMENTS

JP 2011-209402 A 10/2011
JP 2015-161833 A 9/2015
JP 2015-163930 A 9/2015

* cited by examiner

*Primary Examiner* — Howard D Brown, Jr.
(74) *Attorney, Agent, or Firm* — Dority & Manning, P.A.

(57) ABSTRACT

A projector includes an optical device and a processing device. The processing device executes projecting a projection image including a first image onto a projection surface using the optical device, acquiring a first value relating to a first length of the first image on the projection surface, and outputting, based on the first value, information indicating a third value corresponding to a second length of the projection image projected onto the projection surface, the second length being a value at the time when the first length on the projection surface is adjusted to a second value.

20 Claims, 17 Drawing Sheets

PROJECTOR, CONTROL METHOD FOR PROJECTOR, AND NON-TRANSITORY COMPUTER-READABLE STORAGE MEDIUM STORING PROGRAM

The present application is based on, and claims priority from JP Application Serial Number 2023-035338, filed Mar. 8, 2023, the disclosure of which is hereby incorporated by reference herein in its entirety.

BACKGROUND

1. Technical Field

The present disclosure relates to a projector, a control method for a projector, and a non-transitory computer-readable storage medium storing a program.

2. Related Art

There has been known a projector that calculates a projection image size. A projector described in JP-A-2015-163930 includes a distance measurement sensor that measures the distance from the projector to a screen. The projector measures the distance from the projector to the screen using the distance measurement sensor. The projector calculates a projection image size based on the measured distance from the projector to the screen.

The projector described in JP-A-2015-163930 includes the distance measurement sensor in order to calculate the projection image size. Manufacturing cost of the projector increases because the distance measurement sensor is provided.

SUMMARY

A projector of the present disclosure includes an optical device and a processing device. The processing device executes: projecting a projection image including a first image onto a projection surface using the optical device; acquiring a first value relating to a first length of the first image on the projection surface; and outputting, based on the first value, information indicating a third value corresponding to a second length of the projection image projected onto the projection surface, the second length being a value at a time when the first length on the projection surface is adjusted to a second value.

A control method for a projector of the present disclosure includes: projecting a projection image including a first image onto a projection surface; acquiring a first value relating to a first length of the first image on the projection surface; and outputting, based on the first value, information indicating a third value corresponding to a second length of the projection image projected onto the projection surface, the second length being a value at a time when the first length on the projection surface is adjusted to a second value.

A non-transitory computer-readable storage medium storing a program, the program causing a projector to execute: projecting a projection image including a first image onto a projection surface; acquiring a first value relating to a first length of the first image on the projection surface; and outputting, based on the first value, information indicating a third value corresponding to a second length of the projection image projected onto the projection surface, the second length being a value at a time when the first length on the projection surface is adjusted to a second value.

DESCRIPTION OF EMBODIMENTS

Figure 1:
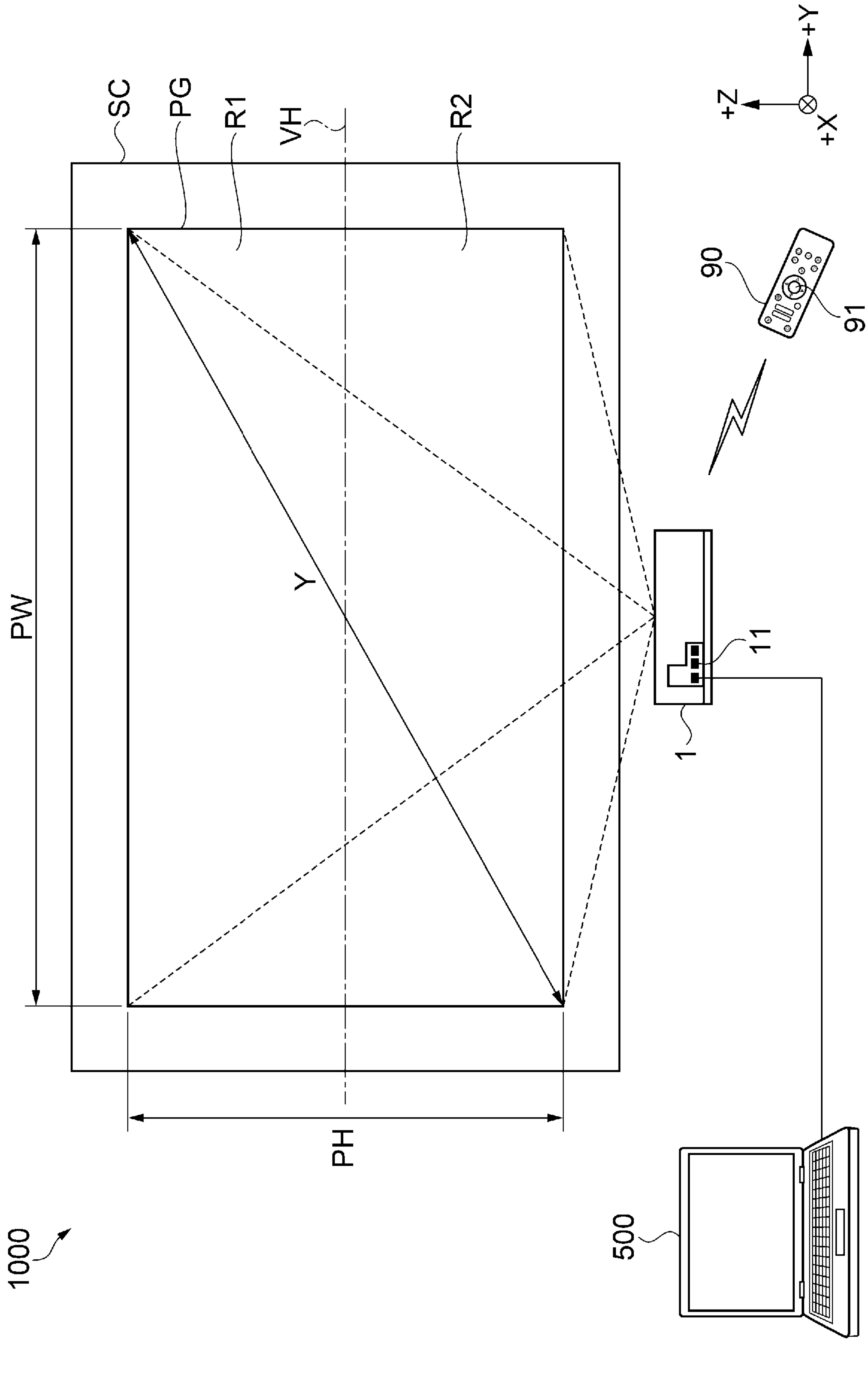
FIG. 1 is a diagram showing a schematic configuration of a projection system.

FIG. 1 shows a schematic configuration of a projection system 1000. The projection system 1000 includes a projector 1 and an image provision device 500. The projector 1 projects a projection image PG onto a projection surface SC. The projection system 1000 shown in FIG. 1 includes one image provision device 500 but is not limited to this. A plurality of image provision devices 500 may be connected to the projector 1.

The projection surface SC displays the projection image PG projected from the projector 1. The projection surface SC shown in FIG. 1 is configured with a screen but is not limited to this. The projection surface SC may be a wall or a ceiling in a room, an outer wall of a building, or the like. A projection surface shape of the projection surface SC is not limited to a plane and may be a three-dimensional shape such as a curved surface, a surface having unevenness, or a spherical surface.

The projector 1 is disposed in a position facing the projection surface SC. The projector 1 is a short-focus projector capable of projecting the projection image PG in a position separated by a short distance from the projection surface SC. As an example, the projector 1 is capable of projecting a 100-inch projection image PG at a distance of 50 cm or less from the projection surface SC. The projector 1 is communicably connected to the image provision device

500. The projector 1 may be communicably connected to an image control device different from the image provision device 500. The projector 1 receives image data from the image provision device 500. The projector 1 projects the projection image PG onto the projection surface SC based on the image data. The projector 1 projects the projection image PG onto the projection surface SC based on display data stored in the projector 1.

The projector 1 includes a terminal 11. The terminal 11 is a connection connector connected to an external device such as the image provision device 500 by wire. The projector 1 includes one or a plurality of terminals 11. In the projection system 1000 shown in FIG. 1, the image provision device 500 is connected to the terminal 11 by wire. The projector 1 may be connected to the image provision device 500 by radio.

The image provision device 500 is communicably connected to the projector 1. The image provision device 500 transmits image data to the projector 1. The image provision device 500 may have a function of adjusting an image shape of the projection image PG projected onto the projection surface SC by the projector 1. The image provision device 500 is configured with a tablet terminal, a smartphone, a mobile computer, a desktop computer, or the like.

The projection system 1000 may include a remote controller 90. The remote controller 90 has an infrared communication function or a Bluetooth communication function. Bluetooth is a registered trademark. The remote controller 90 communicates with the projector 1. The remote controller 90 includes a plurality of operation buttons 91. When a user operates the operation buttons 91, the remote controller 90 transmits an operation signal to the projector 1. The projector 1 receives the operation signal and operates based on the operation signal.

FIG. 1 shows a schematic configuration of the projection image PG projected onto the projection surface SC. FIG. 1 shows the projection image PG having an aspect ratio of a:b. The aspect ratio is a ratio of a long side and a short side of the projection image PG. "a" and "b" are integers representing the aspect ratio. The aspect ratio is, for example, 4:3, 16:9, or 16:10. An image width PW of the projection image PG shown in FIG. 1 is the length of the long side of the projection image PG projected onto the projection surface SC. An image height PH of the projection image PG shown in FIG. 1 is the length of the short side of the projection image PG projected onto the projection surface SC. The projection image PG projected onto the projection surface SC has a rectangular shape. A diagonal line length Y is the length of a diagonal line of the projection image PG projected onto the projection surface SC. The image width PW, the image height PH, and the diagonal line length Y of the projection image PG projected onto the projection surface SC are examples of the length of the projection image PG projected onto the projection surface SC. FIG. 1 shows an imaginary horizontal line VH. The imaginary horizontal line VH is a line parallel to the long side passing the center of the projection image PG. A region above the imaginary horizontal line VH is represented as a first region R1. A region below the imaginary horizontal line VH is represented as a second region R2.

A plurality of figures including FIG. 1 show an XYZ coordinate system. An X axis is an axis orthogonal to the projection surface SC. A +X direction is a direction extending from the near side to the inner side with respect to the projection surface SC. A −X direction is a direction extending from the inner side to the near side with respect to the projection surface SC. A Y axis is an axis parallel to the long side of the projection image PG. A +Y direction is a direction extending from the left to the right with respect to the projection surface SC. A −Y direction is a direction extending from the right to the left with respect to the projection surface SC. A Z axis is an axis orthogonal to the Y axis in the projection surface SC and is parallel to the short side of the projection image PG. A +Z direction is a +Z direction in a left-handed system and, in an example shown in FIG. 1, a direction extending from the bottom to the top of the projection image PG when the projection image PG is a laterally long image. A −Z direction is a direction extending from the top to the bottom of FIG. 1.

Figure 2:
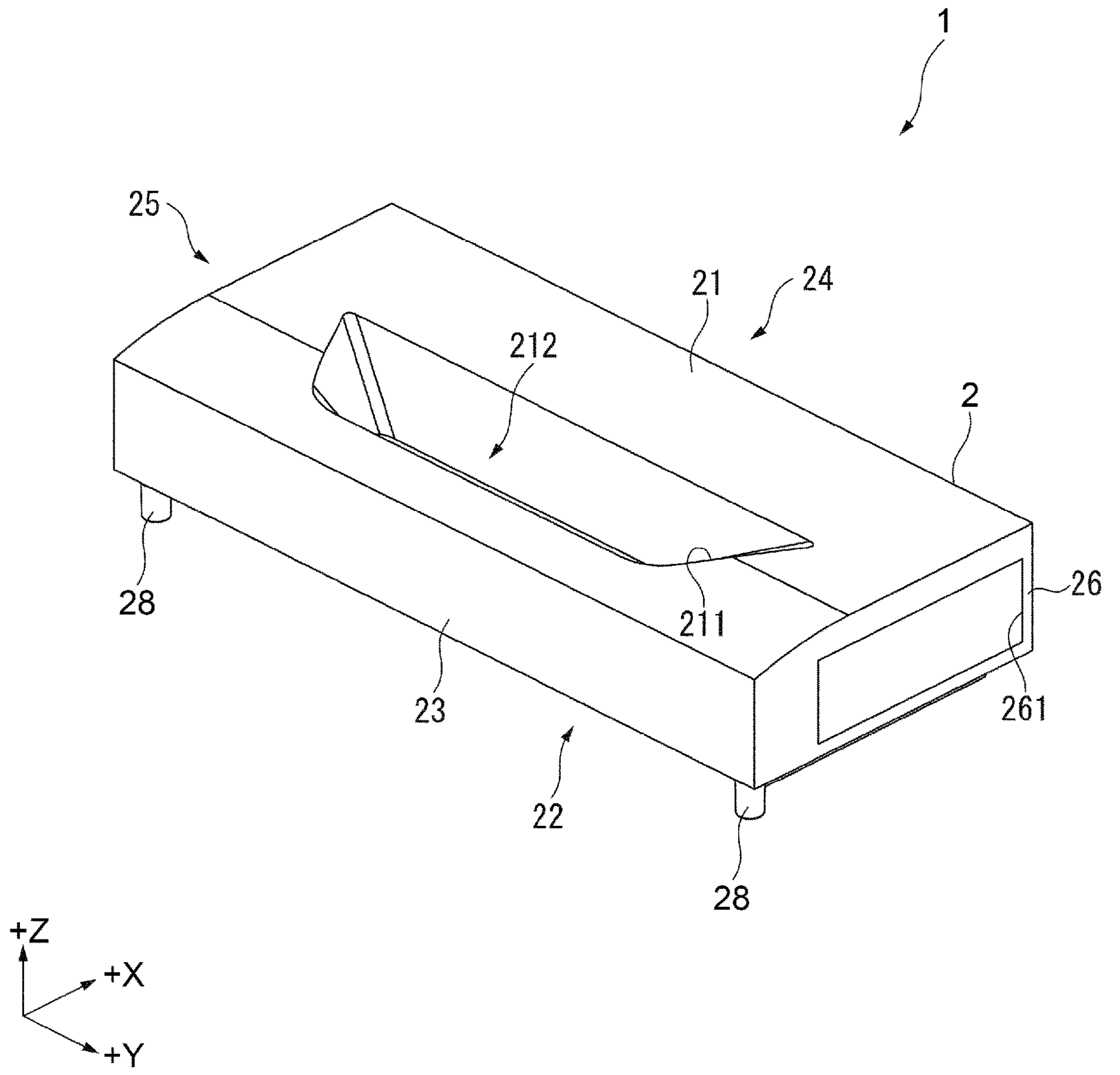
FIG. 2 is a diagram showing an exterior configuration of a projector.

FIG. 2 shows an exterior configuration of the projector 1. FIG. 2 is a perspective view of the projector 1 viewed from the −X direction, the +Y direction, and the +Z direction. FIG. 2 is a diagram of the projector 1 viewed from the front side of the projector 1, which is the opposite direction of a surface facing the projection surface SC. The projector 1 includes an exterior housing 2.

The exterior housing 2 is an exterior of the projector 1. The exterior housing 2 houses various devices and the like configuring the projector 1. The exterior housing 2 is configured in a substantially rectangular parallelepiped shape. The exterior housing 2 includes a top surface 21, a bottom surface 22, a front surface 23, a rear surface 24, a left side surface 25, and a right side surface 26. The exterior housing 2 includes a plurality of legs 28. The exterior housing 2 corresponds to an example of the case.

The top surface 21 is disposed in a position in the +Z direction of the exterior housing 2. The top surface 21 includes a top surface recess 211 and a passing port 212. The top surface recess 211 is configured in a shape recessed in the −Z direction. The passing port 212 is provided in the bottom of the top surface recess 211. The passing port 212 allows image light projected from a projection optical device 35 to pass. The projection optical device 35 is explained below.

The bottom surface 22 is disposed in a position in the −Z direction of the exterior housing 2. The plurality of legs 28 are provided on the bottom surface 22. When the projector 1 is disposed on an installation surface, the plurality of legs 28 are in contact with the installation surface and support the projector 1.

The front surface 23 is disposed in a position in the −X direction of the exterior housing 2. The front surface 23 is a surface facing the user of the projector 1. A logo or the like of the projector 1 is provided on the front surface 23.

The rear surface 24 is disposed in a position in the +X direction of the exterior housing 2. The rear surface 24 is the surface facing the projection surface SC.

The left side surface 25 is disposed in a position in the −Y direction of the exterior housing 2. The left side surface 25 is coupled to the top surface 21, the bottom surface 22, the front surface 23, and the rear surface 24. The left side surface 25 may be configured integrally with any one of the top surface 21, the bottom surface 22, the front surface 23, and the rear surface 24.

The right side surface 26 is disposed in a position on the +Y direction of the exterior housing 2. The right side surface 26 is coupled to the top surface 21, the bottom surface 22, the front surface 23, and the rear surface 24. The right side surface 26 may be configured integrally with any one of the top surface 21, the bottom surface 22, the front surface 23, and the rear surface 24. The right side surface 26 includes a right side surface opening 261. The right side surface opening 261 functions as an introducing port for taking outside air into the inside of the exterior housing 2. The outside air is used as a cooling gas.

Figure 3:
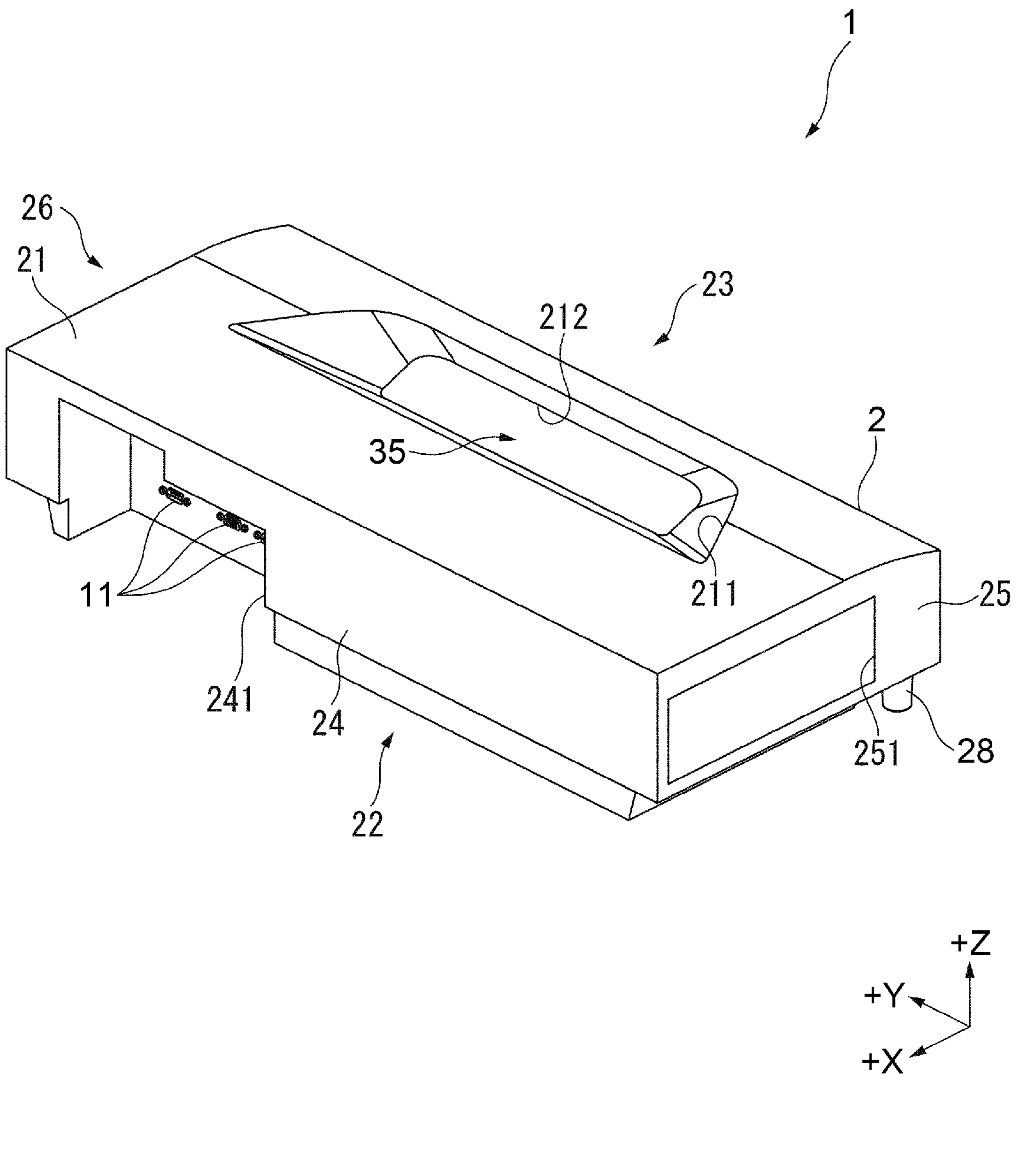
FIG. 3 is a diagram showing an exterior configuration of the projector.

FIG. 3 shows an exterior configuration of the projector 1. FIG. 3 is a perspective view of the projector 1 viewed from the +X direction, the −Y direction, and the +Z direction. FIG. 3 is a diagram of the projector 1 viewed from the rear side of the projector 1, which is the surface facing the projection surface SC.

The rear surface 24 includes a rear surface recess 241. The rear surface recess 241 is configured in a shape recessed in the −X direction. A plurality of terminals 11 are provided in the rear surface recess 241. The projector 1 shown in FIG. 3 includes the plurality of terminals 11 but is not limited to this. One terminal 11 may be provided in the rear surface recess 241.

The left side surface 25 includes a left side surface opening 251. The left side surface opening 251 functions as a discharge port for discharging gas from the inside of the exterior housing 2 to the outside. The projector 1 shown in FIGS. 2 and 3 has a configuration in which the right side surface opening 261 functions as the introducing port and the left side surface opening 251 functions as the discharge port. However, the projector 1 is not limited to this configuration. The projector 1 may have a configuration in which the left side surface opening 251 functions as the introducing port and the right side surface opening 261 functions as the discharge port. The functions of the left side surface opening 251 and the right side surface opening 261 are determined by a layout of the devices and the like housed in the exterior housing 2.

Figure 4:
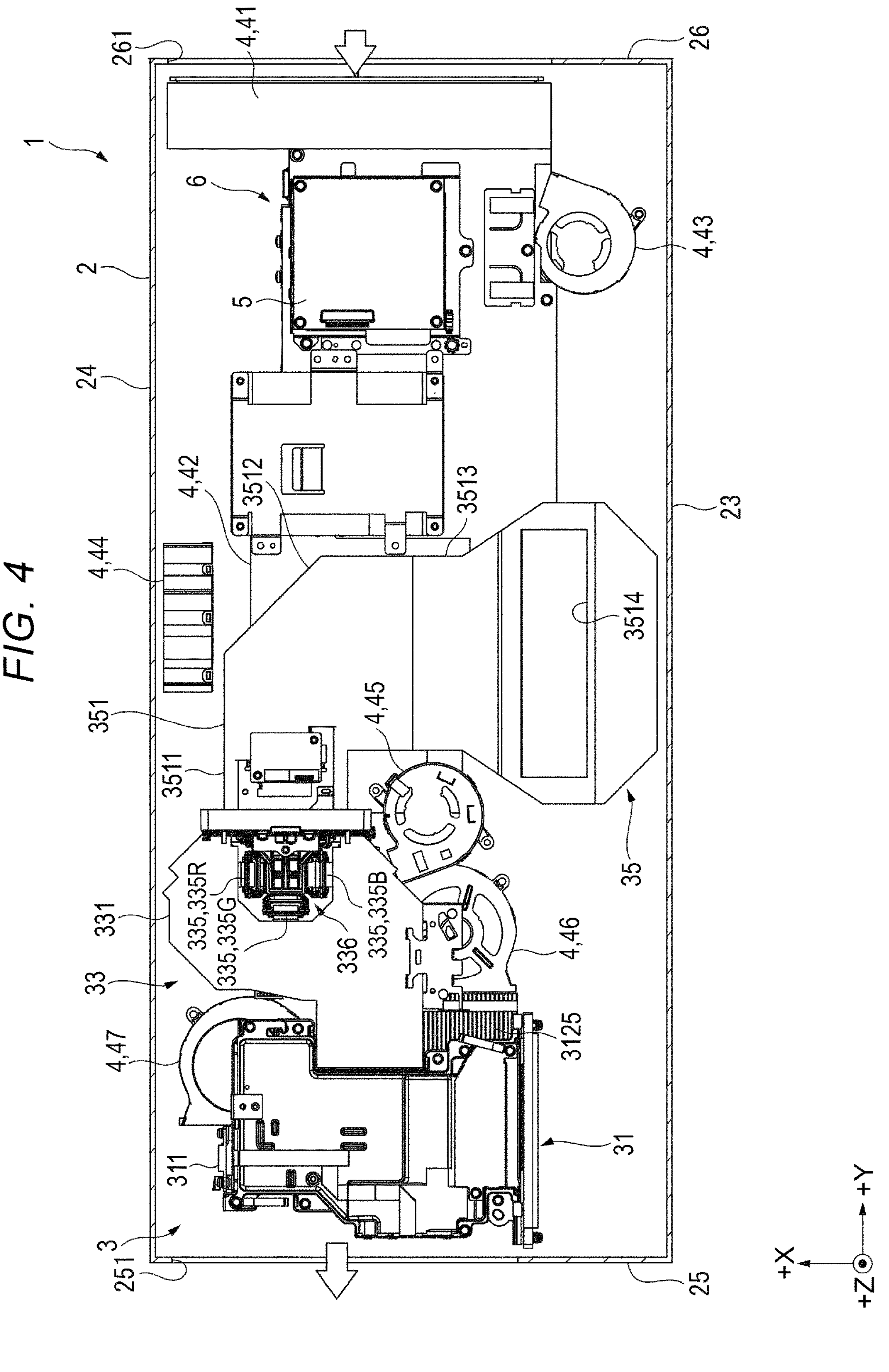
FIG. 4 is a diagram showing a schematic configuration of the projector.

FIG. 4 shows a schematic configuration of the projector 1. FIG. 4 shows an internal configuration of the projector 1 viewed from the +Z direction. The projector 1 includes an image projection device 3, a cooling device 4, a control device 5, and a power supply device 6 on the inside of the exterior housing 2. The projector 1 includes units such as a memory 7 and a communication interface 8 explained below on the inside of the exterior housing 2. The exterior housing 2 shown in FIG. 4 houses the image projection device 3 but is not limited to this. A part of the image projection device 3 may be provided on the outside of the exterior housing 2. The exterior housing 2 houses at least a part of the image projection device 3.

The image projection device 3 generates image light according to image data input from the control device 5. The image projection device 3 projects the image light onto the projection surface SC. The image projection device 3 projects the image light onto the projection surface SC to thereby project the projection image PG onto the projection surface SC. The image projection device 3 includes a light source device 31, an image generation device 33, and the projection optical device 35. The image projection device 3 corresponds to an example of the optical device.

The light source device 31 emits light to the image generation device 33. Details of the light source device 31 are explained below. FIG. 4 shows an exterior of the light source device 31. A first light source housing 311 and a heat radiating member 3125 are provided in the exterior of the light source device 31.

The first light source housing 311 covers parts configuring the light source device 31. The first light source housing 311 prevents dust from intruding into the inside of the light source device 31. The first light source housing 311 is configured in a substantially rectangular parallelepiped shape, a dimension of which along the X axis is larger than a dimension thereof along the Y axis.

The heat radiating member 3125 is configured to be capable of transferring heat to and from the inside of the light source device 31. The heat radiating member 3125 radiates heat generated on the inside of the light source device 31. The heat radiating member 3125 is a heat sink including a plurality of fins. The heat radiating member 3125 cools the inside of the light source device 31.

The image generation device 33 generates image light using light emitted from the light source device 31. The image generation device 33 modulates light made incident from the light source device 31 and generates image light. A detailed configuration of the image generation device 33 is explained below. The image generation device 33 shown in FIG. 4 includes a second light source housing 331, a plurality of light modulation devices 335, and a color combining element 336. The plurality of light modulation devices 335 and the color combining element 336 are covered by the second light source housing 331. FIG. 4 visually recognizably shows the plurality of light modulation devices 335 and the color combining element 336.

The second light source housing 331 covers the various devices and the like configuring the image generation device 33. The second light source housing 331 covers various devices and the like including the light modulation devices 335 and the color combining element 336. The second light source housing 331 prevents dust from intruding into the inside of the image generation device 33.

The light modulation devices 335 modulate, according to image data, lights made incident thereon. The light modulation devices 335 include a blue light modulation element 335B, a green light modulation element 335G, and a red light modulation element 335R.

The color combining element 336 combines the lights modulated by the light modulation devices 335 to thereby generate image light. The image light generated by the color combining element 336 is emitted to the projection optical device 35. As an example, the color combining element 336 is configured with a cross dichroic prism. The color combining element 336 is not limited to the cross dichroic prism. The color combining element 336 may be configured with a plurality of dichroic mirrors.

The projection optical device 35 projects the image light onto the projection surface SC. The projection optical device 35 projects the image light onto the projection surface SC to thereby cause the projection surface SC to display the projection image PG. The projection optical device 35 shown in FIG. 4 includes a lens housing 351.

The lens housing 351 houses a plurality of lenses and the like. The lens housing 351 covers the plurality of lenses and the like to thereby prevent dust from adhering to the lenses and the like. The lens housing 351 includes an incident section 3511, a bending section 3512, an emitter 3513, and an opening 3514.

The image light generated by the color combining element 336 is made incident on the incident section 3511. The incident section 3511 is a member extending along the Y axis. The end portion in the −Y direction of the incident section 3511 is coupled to the image generation device 33.

The bending section 3512 is a member that connects the incident section 3511 and the emitter 3513. The bending section 3512 bends a traveling direction of the image light passing through the incident section 3511 to the −X direction. The bending section 3512 emits the image light to the emitter 3513.

The emitter 3513 is coupled to the bending section 3512. The emitter 3513 is a member extending in the −X direction from the bending section 3512. The opening 3514 is provided in a position in the +Z direction of the emitter 3513.

The opening 3514 is provided in the emitter 3513. The opening 3514 is an opening for emitting the image light having passed through the inside of the lens housing 351 to the outside.

The cooling device 4 cools cooling targets configuring the projector 1. The cooling targets are various parts, various devices, and the like configuring the image projection device 3. The cooling device 4 takes in the outside air from the right side surface opening 261 as a cooling gas and cools the cooling targets using the cooling gas. The cooling device 4 feeds the cooling gas to the cooling targets to thereby cool the cooling targets. The cooling device 4 includes a filter 41, a duct 42, a first fan 43, a second fan 44, a third fan 45, a fourth fan 46, and a fifth fan 47.

The filter 41 is disposed in the right side surface opening 261. The filter 41 is provided to be attachable to and detachable from the right side surface opening 261. The filter 41 removes dust included in the outside air taken in from the right side surface opening 261.

The duct 42 is a housing that guides a part of the cooling gas taken in from the right side surface opening 261. One end of the duct 42 is connected to the filter 41 provided in the right side surface opening 261. The duct 42 extends along the Y axis. The other end of the duct 42 is disposed in a position further in the −Y direction than the center of the exterior housing 2. The duct 42 is disposed in positions in the −Z direction of the control device 5, the power supply device 6, and the projection optical device 35.

The first fan 43 feeds the cooling gas to the control device 5 and the power supply device 6. The first fan 43 is disposed in a position adjacent to the right side surface opening 261. The first fan 43 sucks a part of the cooling gas having passed through the filter 41. The first fan 43 feeds the sucked cooling gas to the control device 5 and the power supply device 6 to thereby cool the control device 5 and the power supply device 6.

The second fan 44 is disposed in a position in the +X direction substantially in the center on the inside of the exterior housing 2. The second fan 44 feeds the cooling gas having cooled the control device 5 and the power supply device 6 in the −Y direction. The second fan 44 feeds the cooling gas toward the left side surface opening 251.

The third fan 45 is disposed in a space surrounded by the light source device 31, the image generation device 33, and the projection optical device 35. The third fan 45 is disposed in a position in the −X direction of the image generation device 33. The third fan 45 sucks the cooling gas having flowed in the duct 42. The third fan 45 feeds the cooling gas to the image generation device 33. The third fan 45 feeds the cooling gas to the image generation device 33 to thereby cool the light modulation devices 335.

The fourth fan 46 is disposed in a space surrounded by the light source device 31, the image generation device 33, and the projection optical device 35. The fourth fan 46 is disposed in a position in the −X direction of the image generation device 33. The fourth fan 46 sucks the cooling gas having flowed in the duct 42. The fourth fan 46 feeds the cooling gas to the heat radiating member 3125 of the light source device 31 to thereby cool the heat radiating member 3125.

The fifth fan 47 discharges the cooling gas flowing on the inside of the exterior housing 2 to the outside. The fifth fan 47 is disposed in a position adjacent to the left side surface opening 251. The fifth fan 47 feeds the cooling gas toward the left side surface opening 251 to thereby discharge the cooling gas to the outside of the exterior housing 2.

The control device 5 is a controller that controls an operation of the projector 1. The control device 5 is a circuit board on which an arithmetic processing circuit such as a CPU (Central Processing Unit) is provided. The control device 5 is configured with one or a plurality of circuit boards. The control device 5 is provided in a position in the +Y direction with respect to the projection optical device 35. The control device 5 corresponds to an example of the processing device.

The power supply device 6 supplies electric power to the devices and the like configuring the projector 1. The power supply device 6 transforms electric power supplied from the outside and supplies the transformed electric power to the devices and the like. The power supply device 6 is provided in a position in the +Y direction with respect to the projection optical device 35.

Figure 5:
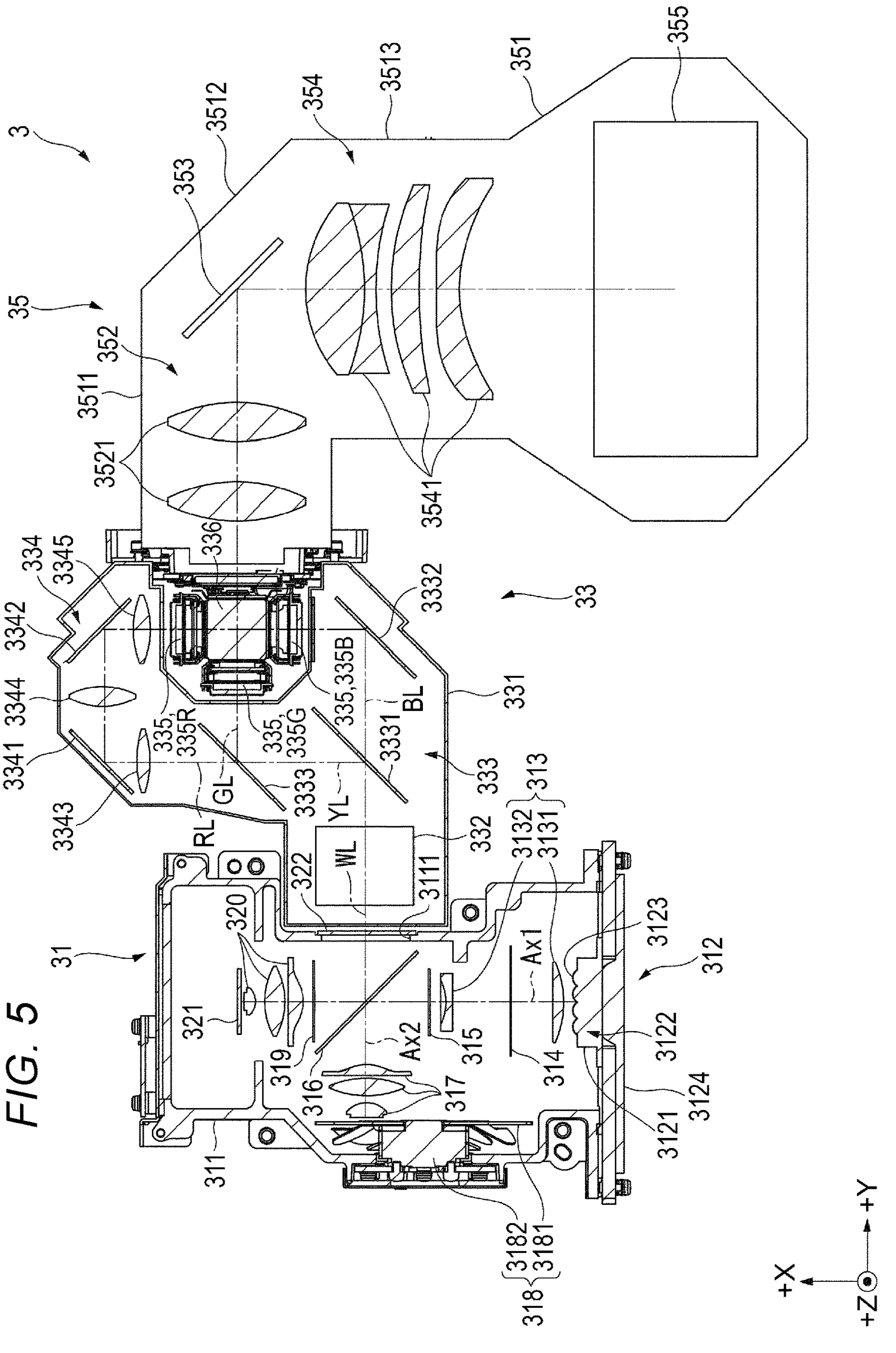
FIG. 5 is a diagram showing a schematic configuration of an image projection device.

FIG. 5 shows a schematic configuration of the image projection device 3. FIG. 5 shows an internal configuration of the image projection device 3 viewed from the +Z direction. FIG. 5 shows internal configurations of the light source device 31, the image generation device 33, and the projection optical device 35.

The light source device 31 emits white light WL to the image generation device 33. In the light source device 31, a light source 312, an afocal optical element 313, a first phase difference element 314, a diffusing and transmitting element 315, a light combining element 316, a first condensing element 317, a wavelength conversion device 318, a second phase difference element 319, a second condensing element 320, a diffusing optical element 321, and a third phase difference element 322 are housed on the inside of the first light source housing 311. The light source 312, the afocal optical element 313, the first phase difference element 314, the diffusing and transmitting element 315, the light combining element 316, the second phase difference element 319, the second condensing element 320, and the diffusing optical element 321 are disposed on a first illumination optical axis Ax1. The wavelength conversion device 318, the first condensing element 317, the light combining element 316, and the third phase difference element 322 are disposed on a second illumination optical axis Ax2. The second illumination optical axis Ax2 is orthogonal to the first illumination optical axis Ax1.

The first light source housing 311 includes an emission port 3111 for emitting the white light WL toward the image generation device 33. The emission port 3111 is provided in a position connected to the image generation device 33. The emission port 3111 emits the white light WL along the second illumination optical axis Ax2.

The light source 312 emits light along the first illumination optical axis Ax1. The light source 312 emits light in the +X direction. The light source 312 includes a supporting member 3121, a plurality of solid-state light emitting elements 3122, a plurality of collimator lenses 3123, and a heat receiving member 3124.

The supporting member 3121 has an orthogonal plane orthogonal to the first illumination optical axis Ax1. The supporting member 3121 supports the plurality of solid-state light emitting elements 3122 disposed on the orthogonal plane. The supporting member 3121 is configured with a member made of metal. The supporting member 3121 transfers heat generated by the solid-state light emitting elements 3122 to the heat receiving member 3124.

The plurality of solid-state light emitting elements 3122 emit s-polarized blue light. As an example, the solid-state light emitting elements 3122 are configured with semiconductor lasers. The s-polarized blue light emitted by the solid-state light emitting elements 3122 is laser light having a peak wavelength of 440 nm. Each of the plurality of solid-state light emitting elements 3122 emits the s-polarized blue light in the +X direction. The plurality of solid-state light emitting elements 3122 emit the s-polarized blue light but are not limited to this. The plurality of solid-state light emitting elements 3122 may emit the s-polarized blue light and p-polarized blue light.

Each of the plurality of collimator lenses 3123 is provided to correspond to the solid-state light emitting element 3122. The collimator lens 3123 converts the s-polarized blue light emitted from the solid-state light emitting element 3122 into a parallel light beam. The collimator lens 3123 makes the parallel light beam incident on the afocal optical element 313.

The heat receiving member 3124 is provided in a position in the −X direction of the supporting member 3121. The heat receiving member 3124 is coupled to the supporting member 3121 to be capable of transferring heat. The heat receiving member 3124 receives, via the supporting member 3121, heat generated by the solid-state light emitting elements 3122. The heat receiving member 3124 is coupled to a not-shown heat pipe to be capable of transferring heat. The heat pipe is coupled to the heat radiating member 3125 to be capable of transferring heat. The heat receiving member 3124 transfers heat to the heat radiating member 3125 via the heat pipe. The heat radiating member 3125 radiates the transferred heat. The heat radiating member 3125 radiates heat to thereby cool the solid-state light emitting element 3122 via the supporting member 3121 and the heat receiving member 3124.

The afocal optical element 313 reduces a light beam made incident from the light source 312 in diameter. The afocal optical element 313 is configured with a first lens 3131 and a second lens 3132. The first lens 3131 condenses the light beam made incident from the light source 312. The second lens 3132 collimates the light beam condensed by the first lens 3131. The light source device 31 shown in FIG. 5 includes the afocal optical element 313 but is not limited to this. The light source device 31 may not include the afocal optical element 313.

The first phase difference element 314 is provided between the first lens 3131 and the second lens 3132. The first phase difference element 314 converts one kind of linearly polarized light made incident from the first lens 3131 into a light beam including s-polarized blue light and p-polarized blue light. The first phase difference element 314 may be turned centering on a turning axis extending along the first illumination optical axis Ax1 by a not-shown turning device. The first phase difference element 314 is turned, whereby a ratio of the s-polarized blue light and the p-polarized blue light in the light beam emitted from the first phase difference element 314 is adjusted.

The diffusing and transmitting element 315 uniformizes an illuminance distribution of a light beam made incident from the second lens 3132. The diffusing and transmitting element 315 has a configuration including a hologram, a configuration in which a plurality of small lenses are arrayed on an optical axis orthogonal surface, or a configuration in which a surface through which a light beam passes is a rough surface. The light source device 31 shown in FIG. 5 includes the diffusing and transmitting element 315 but is not limited to this. The light source device 31 may include, instead of the diffusing and transmitting element 315, a homogenizer including a pair of multi-lenses.

The light combining element 316 separates an s-polarized light component and a p-polarized light component included in a light beam made incident thereon. As an example, the light combining element 316 is a polarizing beam splitter. The light combining element 316 reflects the s-polarized light component and transmits the p-polarized light component. The light combining element 316 has a color separation characteristic for transmitting light having a predetermined wavelength or more in the s-polarized light component and the p-polarized light component. The light combining element 316 reflects s-polarized blue light in a light beam made incident thereon from the diffusing and transmitting element 315 and transmits p-polarized blue light in the light beam. The s-polarized blue light is reflected by the light combining element 316 and made incident on the first condensing element 317. The p-polarized blue light is transmitted through the light combining element 316 and made incident on the second phase difference element 319.

The light combining element 316 may have a half mirror function and a dichroic mirror function. The half mirror function is a function of transmitting a part of light components in the light beam made incident from the diffusing and transmitting element 315 and reflecting the other light components. The dichroic mirror function is a function of reflecting light made incident from the diffusing optical element 321 and transmitting light made incident from the wavelength conversion device 318. When the light combining element 316 has the half mirror function and the dichroic mirror function, the light source device 31 may not include the first phase difference element 314 and the second phase difference element 319.

The first condensing element 317 condenses the s-polarized light component reflected by the light combining element 316 in the wavelength conversion device 318. The first condensing element 317 collimates light made incident thereon from the wavelength conversion device 318. The first condensing element 317 shown in FIG. 5 is configured with three lenses but is not limited to this. The number of lenses configuring the first condensing element 317 is not limited.

The wavelength conversion device 318 converts a wavelength of light made incident thereon. The wavelength conversion device 318 emits fluorescent light excited by the incident light. The wavelength conversion device 318 includes a wavelength conversion element 3181 and a rotating device 3182.

As an example, the wavelength conversion element 3181 is a phosphor wheel including a substrate and a phosphor layer. The phosphor layer is provided on a light incident surface of the substrate. The phosphor layer contains phosphor particles. The phosphor particles are excited by light, which is excitation light, being made incident. The phosphor particles emit fluorescent light having a wavelength longer than a wavelength of s-polarized blue light made incident thereon. As an example, the fluorescent light is light having a peak wavelength of 500 to 700 nm and includes green light and red light. A light emission optical axis of the wavelength conversion element 3181 is orthogonal to a light emission optical axis of the solid-state light emitting element 3122. The light emission optical axis of the wavelength conversion element 3181 coincides with the second illumination optical axis Ax2, which is a light emission optical axis of the light source device 31.

The rotating device 3182 rotates the wavelength conversion element 3181 centering on a rotation axis. The rotation axis of the rotating device 3182 is an axis extending along the second illumination optical axis Ax2. As an example, the rotating device 3182 is configured with a motor.

The wavelength conversion device 318 emits the fluorescent light in the +Y direction along the second illumination optical axis Ax2. The fluorescent light emitted from the wavelength conversion device 318 passes through the first condensing element 317 and the light combining element 316 along the second illumination optical axis Ax2 and is made incident on the third phase difference element 322.

The second phase difference element 319 is disposed between the light combining element 316 and the second condensing element 320. The second phase difference element 319 converts the p-polarized blue light transmitted through the light combining element 316 into circularly polarized blue light.

The second condensing element 320 condenses the circularly polarized blue light made incident from the second phase difference element 319 into the diffusing optical element 321. The second condensing element 320 collimates the circularly polarized blue light made incident from the diffusing optical element 321. The number of lenses configuring the second condensing element 320 can be set as appropriate.

The diffusing optical element 321 reflects the incident circularly polarized blue light in the −X direction at the same diffusion angle as a diffusion angle of the fluorescent light emitted from the wavelength conversion device 318. The diffusing optical element 321 is a reflection member that performs Lambertian reflection of the incident circularly polarized blue light. A light emission optical axis of the diffusing optical element 321 coincides with the first illumination optical axis Ax1 and is orthogonal to the second illumination optical axis Ax2. The diffusion optical element 321 is disposed in a position in the +X direction with respect to the second illumination optical axis Ax2. The light source device 31 may include a second rotating device that rotates the diffusing optical element 321 centering on a rotation axis parallel to the first illumination optical axis Ax1.

The circularly polarized blue light reflected by the diffusing optical element 321 passes through the second condensing element 320 and, thereafter, is made incident on the second phase difference element 319. When being reflected by the diffusing optical element 321, the circularly polarized blue light is converted into circularly polarized blue light, a rotating direction of which is reversed. The circularly polarized blue light made incident on the second phase difference element 319 via the second condensing element 320 is converted into s-polarized blue light by the second phase difference element 319. The s-polarized blue light made incident on the light combining element 316 from the second phase difference element 319 is reflected by the light combining element 316 and made incident on the third phase difference element 322. Light made incident on the third phase difference element 322 from the light combining element 316 is white light WL in which the s-polarized blue light and the fluorescent light are mixed.

The third phase difference element 322 converts the white light WL made incident from the light combining element 316 into light in which an s-polarized light component and a p-polarized light component are mixed. The white light WL, a polarization state of which has been converted by the third phase difference element 322, is emitted in the +Y direction from the light source device 31 along the second illumination optical axis Ax2 and made incident on the image generation device 33.

The image generation device 33 houses a uniformizing device 332, a color separation device 333, a relay device 334, the light modulation devices 335, and the color combining element 336 in the second light source housing 331. The uniformizing device 332, the color separation device 333, and the relay device 334 are held by the second light source housing 331.

The uniformizing device 332 uniformizes the illuminance of the white light WL made incident from the light source device 31. The uniformizing device 332 aligns the polarization state of the white light WL. As an example, the uniformizing device 332 is configured with a pair of lens arrays, a polarization converting element, and a superimposing lens. The pair of lens arrays uniformizes the illuminance of the white light WL. The polarization converting element aligns the polarization state of the white light WL. The superimposing lens superimposes a plurality of partial light beams divided by the pair of lens arrays on a modulation region. The pair of lens arrays, the polarization converting element, and the superimposing lens are not shown. As an example, the white light WL having passed through the uniformizing device 332 is s-polarized linearly polarized light. The white light WL having passed through the uniformizing device 332 illuminates modulation regions of the light modulation devices 335 through the color separation device 333 and the relay device 334.

The color separation device 333 separates the white light WL made incident from the uniformizing device 332 into blue light BL, green light GL, and red light RL. The color separation device 333 includes a first color separation element 3331, a first reflection element 3332, and a second color separation element 3333.

The first color separation element 3331 is disposed in a position in the +Y direction of the uniformizing device 332. The first color separation element 3331 allows the blue light BL included in the white light WL to pass in the +Y direction. The first color separation element 3331 reflects yellow light YL included in the white light WL in the +X direction. The first color separation element 3331 separates the white light WL into the blue light BL and the yellow light YL.

The first reflection element 3332 reflects, in the +X direction, the blue light BL having passed through the first color separation element 3331. The blue light BL reflected by the first reflecting element 3332 is made incident on the blue light modulation element 335B. An optical axis of the blue light BL between the first color separation element 3331 and the first reflection element 3332 coincides with the second illumination optical axis Ax2.

The second color separation element 3333 is disposed in a position in the +X direction of the first color separation element 3331. The second color separation element 3333 reflects, in the +Y direction, the green light GL included in the yellow light YL reflected by the first color separation element 3331. The second color separation element 3333 allows the red light RL included in the yellow light YL to pass in the +X direction. The second color separation element 3333 separates the yellow light YL into the green light GL and the red light RL. The green light GL separated by the second color separation element 3333 is made incident on the green light modulation element 335G. The red light RL separated by the second color separation element 3333 is made incident on the relay device 334.

The relay device 334 is provided on an optical path of the red light RL longer than an optical path of the blue light BL and an optical path of the green light GL. The relay device 334 suppresses a loss of the red light RL. The relay device 334 includes a second reflection element 3341, a third reflection element 3342, an incident side lens 3343, a relay lens 3344, and an emission side lens 3345.

The second reflection element 3341 is disposed in a position in the +X direction of the second color separation element 3333. The second reflection element 3341 reflects, in the +Y direction, the red light RL having passed through the second color separation element 3333.

The third reflection element 3342 is disposed in a position in the +Y direction of the second reflection element 3341. The third reflection element 3342 reflects, in the −X direction, the red light RL reflected by the second reflection element 3341.

The incident side lens 3343 is disposed between the second color separation element 3333 and the second reflection element 3341. The incident side lens 3343 collimates the red light RL having passed through the second color separation element 3333. The incident side lens 3343 guides the red light RL to the second reflection element 3341.

The relay lens 3344 is disposed between the second reflection element 3341 and the third reflection element 3342. The relay lens 3344 condenses the red light RL reflected by the second reflection element 3341. The relay lens 3344 makes the red light RL incident on the third reflection element 3342.

The emission side lens 3345 is disposed between the third reflection element 3342 and the red light modulation element 335R. The emission side lens 3345 makes the red light RL reflected by the third reflection element 3342 incident on the red light modulation element 335R.

In the image generation device 33 shown in FIG. 5, the relay device 334 is provided on the optical path of the red light RL. However, the image generation device 33 is not limited to this. As an example, when the optical path of the blue light BL is formed longer than the optical path of the green light GL and the optical path of the red light RL, the relay device 334 is provided on the optical path of the blue light BL.

The light modulation devices 335 include the blue light modulation element 335B, the green light modulation element 335G, and the red light modulation element 335R. Each of the blue light modulation element 335B, the green light modulation element 335G, and the red light modulation element 335R includes a transmissive liquid crystal panel and a pair of polarizing plates sandwiching the transmissive liquid crystal panel. The transmissive liquid crystal panel and the pair of polarizing plates are not shown.

The blue light modulation element 335B modulates the blue light BL made incident in the +X direction from the first reflection element 3332. The blue light BL modulated by the blue light modulation element 335B is made incident on the color combining element 336 disposed in a position in the +X direction of the blue light modulation element 335B.

The green light modulation element 335G modulates the green light GL made incident in the +Y direction from the second color separation element 3333. The green light GL modulated by the green light modulation element 335G is made incident on the color combining element 336 disposed in a position in the +Y direction of the green light modulation element 335G.

The red light modulation element 335R modulates the red light RL made incident in the −X direction from the emission side lens 3345. The red light RL modulated by the red light modulation element 335R is made incident on the color combining element 336 disposed in a position in the −X direction of the red light modulation element 335R.

The color combining element 336 combines the blue light BL, the green light GL, and the red light RL to thereby generate image light. The color combining element 336 reflects, in the +Y direction, the blue light BL made incident in the +X direction from the blue light modulation element 335B. The color combining element 336 transmits, in the +Y direction, the green light GL made incident in the +Y direction from the green light modulation element 335G. The color combining element 336 reflects, in the +Y direction, the red light RL made incident in the −X direction from the red light modulation element 335R. The image light generated by the color combining element 336 is emitted in the +Y direction along a light emission optical axis of the image generation device 33. The image light is made incident on the projection optical device 35. An optical axis of the green light GL reflected by the second color separation element 3333 coincides with a light emission optical axis of the color combining element 336. The light emission optical axis of the color combining element 336 coincides with a light incident optical axis of the projection optical device 35.

The projection optical device 35 includes the lens housing 351. The lens housing 351 includes the incident section 3511, the bending section 3512, the emitter 3513, and the opening 3514. The incident section 3511 configures an incident optical path 352. A bending member 353 is provided in the bending section 3512. The emitter 3513 configures a passage optical path 354. An optical path changing member 355 is provided in the emitter 3513.

The incident optical path 352 is an optical path on which image light is made incident. The image light is made incident in the +Y direction from the image generation device 33. The light incident optical axis of the projection optical device 35 is an optical axis of the incident optical path 352 extending along the Y axis. The light incident optical axis of the projection optical device 35 is parallel to the second illumination optical axis Ax2 of the light source device 31. A plurality of incident optical path lenses 3521 are provided in the incident optical path 352. The plurality of incident optical path lenses 3521 are supported by the incident section 3511.

The bending member 353 bends a traveling direction of the image light passing on the incident optical path 352. The bending member 353 reflects, in the −X direction, the image light made incident in the +Y direction to thereby bend a traveling direction of the image light. As an example, the bending member 353 is configured with a reflection mirror.

The passage optical path 354 is an optical path on which the image light, the traveling direction of which is bent by the bending member 353, passes. The passage optical path 354 is provided on the inside of the emitter 3513 extending along the X axis. The image light travels in the −X direction on the passage optical path 354. The passage optical path 354 includes a plurality of passage optical path lenses 3541. The passage optical path lenses 3541 are supported by the emitter 3513.

The optical path changing member 355 is provided in a position in the −X direction of the passage optical path 354. The optical path changing member 355 reflects the image light. The optical path changing member 355 changes a traveling direction of the image light traveling in the −X direction on the passage optical path 354 to the +X direction and the +Z direction. As an example, the optical path changing member 355 is configured with an aspherical mirror. The image light reflected by the optical path changing member 355 passes through the opening 3514 shown in FIG. 4. The image light having passed through the opening 3514 travels in the +X direction. When traveling in the +X direction, the image light is diffused along the Y axis and the Z axis. Since the optical path changing member 355 is provided, a large-screen projection image PG can be projected onto the projection surface SC when the distance between the projector 1 and the projection surface SC is short.

Figure 6:
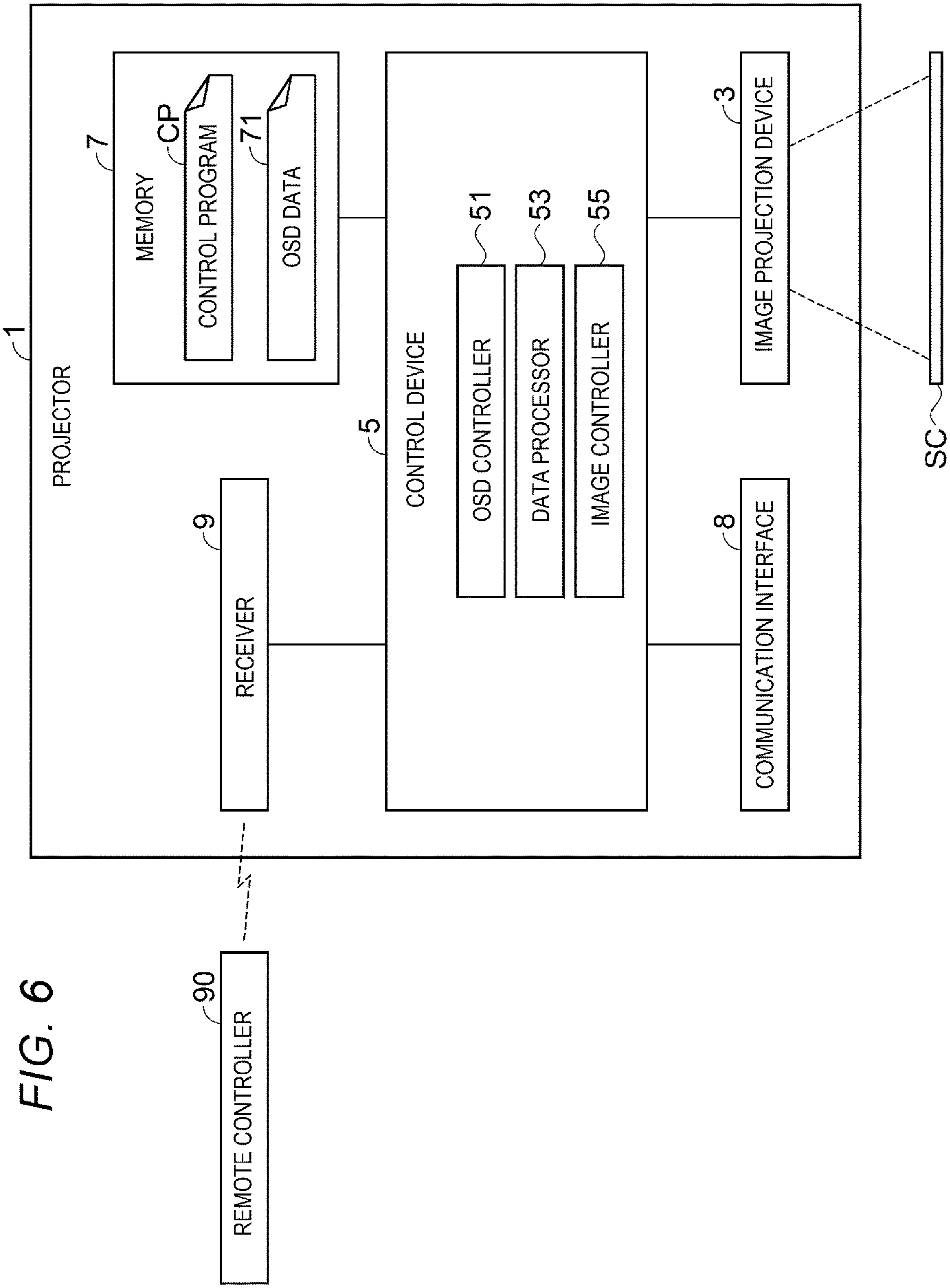
FIG. 6 is a diagram showing a block configuration of the projector.

FIG. shows a block configuration of the projector 1. FIG. 6 shows the projector 1 and the remote controller 90. The projector 1 and the remote controller 90 communicate by infrared communication or Bluetooth communication.

The projector 1 includes the image projection device 3, the control device 5, the memory 7, the communication interface 8, and a receiver 9. FIG. 6 shows the projector 1 in which the cooling device 4 and the power supply device 6 are omitted.

The image projection device 3 projects the projection image PG onto the projection surface SC based on control of the control device 5. The image projection device 3 projects the projection image PG based on image data transmitted from the image provision device 500. The image projection device 3 projects an OSD image 100 onto the projection surface SC. OSD is an abbreviation of on screen display. The OSD image 100 is displayed in the projection image PG. The OSD image 100 displays setting, operation information, and the like of the projector 1. Details of the OSD image 100 are explained below.

The control device 5 executes a control program CP to thereby function as various functional units. The control program CP is stored in the memory 7. The control device 5 executes the control program CP to thereby function as an OSD controller 51, a data processor 53, and an image controller 55.

The OSD controller 51 is a functional unit that causes the projector 1 to display various OSD images 100 in the projection image PG. The OSD controller 51 causes the projector 1 to display the various OSD images 100 based on OSD data 71. The OSD data 71 is stored in the memory 7. The OSD image 100 includes an adjustment image 101. The adjustment image 101 corresponds to an example of the first image. The OSD image 100 may include any one of various messages, an image showing operation, an input data image, and the like.

The data processor 53 is a functional unit that calculates size data corresponding to the length of the projection image PG projected onto the projection surface SC. The data processor 53 calculates the size data based on input data input by the user. The size data is calculated by the data processor 53. As an example, the size data is the diagonal line length Y of the projection image PG projected onto the projection surface SC. The size data may be the image height PH or the image width PW. The image height PH is the length of a side extending along the Z axis of the projection image PG projected onto the projection surface SC. The image width PW is the length of a side extending along the Y axis of the projection image PG projected onto the projection surface SC. When the size data is the image height PH or the image width PW, the size of the projection image PG projected onto the projection surface SC is calculated according to the image height PH or the image width PW and an aspect ratio. The size data, which is the length of the projection image PG projected onto the projection surface SC, corresponds to an example of the third value.

The data processor 53 outputs information indicating the size data. The information indicating the size data is the diagonal line length Y of the projection image PG projected onto the projection surface SC or data obtained by converting the diagonal line length Y. The information indicating the size data may be the image height PH and the image width PW of the projection image PG projected onto the projection surface SC. The information indicating the size data may be data obtained by converting the image height PH and the image width PW. The information indicating the size data corresponds to an example of the information indicating the third value. The data processor 53 outputs the information indicating the size data to the external device via the communication interface 8. The data processor 53 may output the information indicating the size data to the OSD controller 51. The information indicating the size data is input to the OSD controller 51. The OSD controller 51 causes the projector 1 to display the size data and the like in the projection image PG based on the information indicating the size data. The data processor 53 may output the information indicating the size data to the memory 7. The memory 7 stores the information indicating the size data.

The image controller 55 is a functional unit that performs image processing on image data transmitted from the image provision device 500. The image controller 55 corrects the image data using various setting values. The various setting values are stored in the memory 7. The setting values are correction values or the like relating to an aspect ratio, contrast, brightness, and geometrical distortion correction. The image controller 55 may perform image processing for causing the projector 1 to superimpose and display the OSD image 100 on an image based on the image data.

The memory 7 stores various data. The memory 7 is configured with a semiconductor element such as a RAM (Random Access Memory) or a ROM (Read Only Memory). The memory 7 stores the control program CP and the OSD data 71. The memory 7 stores the various setting values used by the image controller 55, the information indicating the size data calculated by the data processor 53, and the like.

The control program CP is firmware for causing the control device 5 to function as various functional units. The control program CP causes the control device 5 to operate as the OSD controller 51, the data processor 53, and the image controller 55. The control program CP may cause the control device 5 to operate as functional units other than the OSD controller 51, the data processor 53, and the image controller 55. The control program CP corresponds to an example of the program.

The OSD data 71 is various data relating to the OSD image 100 displayed in the projection image PG. The OSD data 71 includes a reference value used when length of the projection image PG projected onto the projection surface SC is calculated. The reference value is data relating to a size of the projection image PG projected onto the projection surface SC. The size of the projection image PG projected onto the projection surface SC is the length, the height, and the width of a diagonal line. The size of the projection image PG projected onto the projection surface SC corresponds to an example of the second length. The reference value is data relating to the length of the adjustment image 101 on the projection surface SC. The adjustment image 101 is included in the OSD image 100. The adjustment image 101 is explained below. The reference value corresponds to an example of the first value. The data processor 53 calculates size data using the reference value. A method of calculating the size data is explained below. The reference value is the width of the exterior housing 2 of the projector 1, the width of the remote controller 90, or the like. The reference value may be an approximate value of a size of a face of a person, a size of an animal, or the like. The OSD data 71 includes an aspect ratio of the projection image PG projected onto the projection surface SC, various messages, various operation images, and various adjustment image data.

The communication interface 8 is an interface circuit communicably connected to the image provision device 500. The communication interface 8 is connected to the image provision device 500 by wire or radio according to a predetermined communication protocol. The communication interface 8 includes a wired connector and a wireless communication port. The wired connector is a HDMI (High-Definition Multimedia Interface) connector, a USB (Universal Serial Bus) connector, a LAN (Local Area Network) connector, or the like. The wireless communication port is a Wi-Fi communication port, a Bluetooth communication port, or the like. HDMI, Wi-Fi, and Bluetooth are registered trademarks. The communication interface 8 receives image data from the image provision device 500. The communication interface 8 transmits various setting data and the like of the projector 1 to the image provision device 500 according to the control of the control device 5. The communication interface 8 may transmit the information indicating the size data to the image provision device 500. The communication interface 8 may communicatively connected to an external device different from the image provision device 500. The communication interface 8 transmits the various setting data, the information indicating the size data, and the like to the external device. The communication interface 8 outputs the information indicating the size data to the image provision device 500 or the external device.

The receiver 9 receives an operation signal from the remote controller 90. The receiver 9 receives the operation signal by infrared communication or Bluetooth communication. The receiver 9 includes an antenna and a reception circuit for receiving the operation signal. The operation signal includes a power supply operation signal for operating a power supply of the projector 1, an instruction signal relating to the OSD image 100, and an adjustment signal. The adjustment signal is a signal for instructing to change a size of the adjustment image 101. The receiver 9 transmits the operation signal to the control device 5. The control device 5 receives the operation signal as input data and performs various kinds of control based on the operation signal.

The remote controller 90 transmits an operation signal to the receiver 9. When the user performs operation on any one of the plurality of operation buttons 91 included in the remote controller 90, the remote controller 90 transmits an operation signal to the receiver 9. The remote controller 90 transmits an operation signal corresponding to each of the plurality of operation buttons 91 to the receiver 9.

The projector 1 may include a not-shown operation panel. The operation panel is provided in the exterior housing 2. The operation panel includes a not-shown input button or a not-shown touch panel. The operation panel receives operation by the user like the remote controller 90. The operation panel transmits an operation signal based on the operation of the user to the control device 5. The operation panel functions as an input device.

Figure 7:
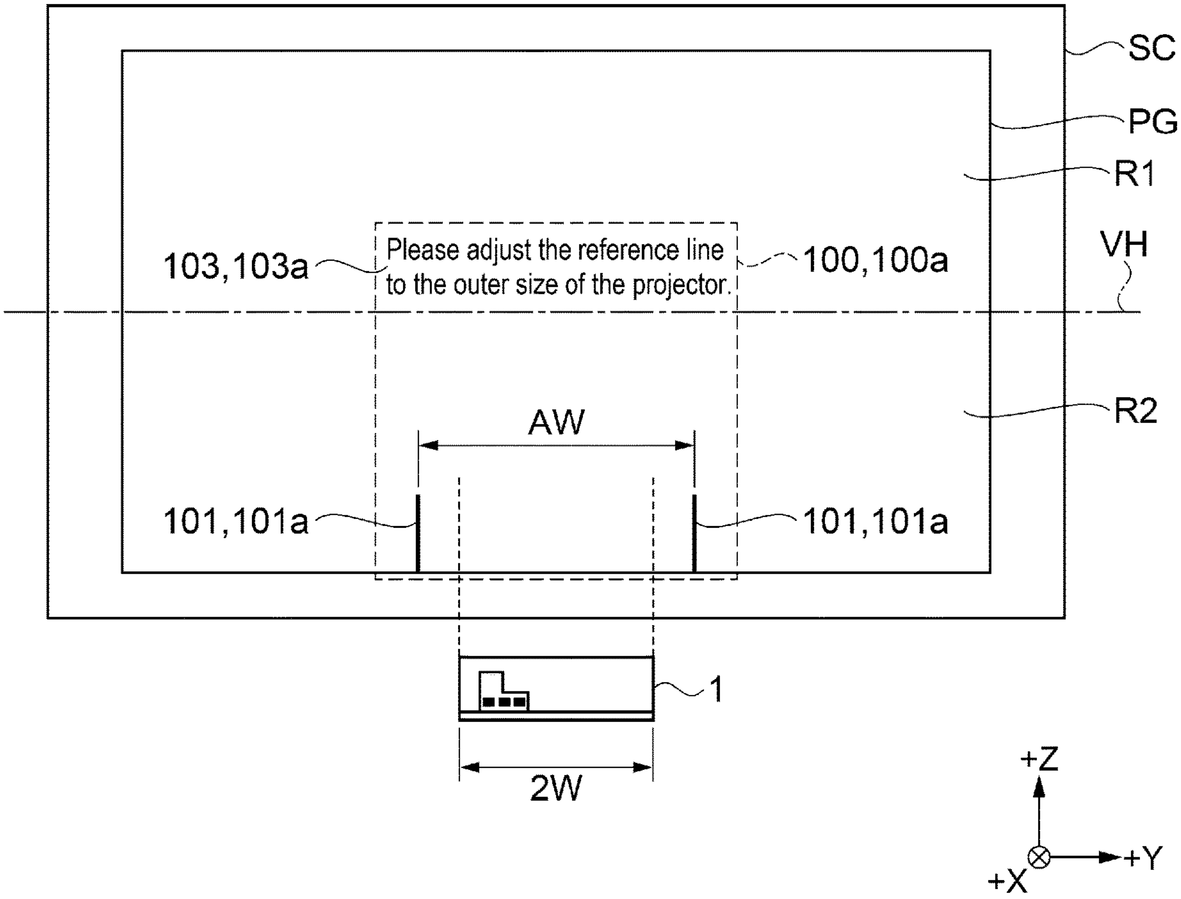
FIG. 7 is a diagram showing an example of a projection image including an OSD image.

FIG. 7 shows an example of the projection image PG including the OSD image 100. FIG. 7 shows the projection image PG projected onto the projection surface SC. The projection image PG is projected by the projector 1 disposed in a position in the −Z direction of the projection surface SC. The projection image PG including the OSD image 100 is projected onto the projection surface SC using the image projection device 3 of the projector 1. The projector 1 is disposed below the projection surface SC. The projection image PG shown in FIG. 7 includes a first OSD image 100*a*, which is an example of the OSD image 100. An aspect ratio of the projection image PG shown in FIG. 7 is a:b. The first OSD image 100*a* shown in FIG. 7 includes a first adjustment image 101*a* and a first message image 103*a*. The first adjustment image 101*a* is an example of the adjustment image 101. The first message image 103*a* is an example of a message image 103. FIG. 7 shows the imaginary horizontal line VH.

The first adjustment image 101*a* is an image for causing the user to adjust an adjustment image width AW. The first adjustment image 101*a* is formed by two reference lines extending along the Z axis. Width along the Y axis between the two reference lines corresponds to the adjustment image width AW. The first adjustment image 101*a* is displayed in the second region R2 of the projection image PG. The first adjustment image 101*a* is disposed in a region close to the projector 1 when the projection image PG is horizontally equally divided into two.

The first message image 103*a* is an image for displaying information notified to the user. The first message image 103*a* is a message for urging the user to adjust the adjustment image width AW. The first message image 103*a* represents the first adjustment image 101*a* as a reference line. The first message image 103*a* is a message for requesting the user to match the adjustment image width AW to an exterior width 2W of the projector 1. The message image 103 corresponds to an example of the second image. A sentence of the first message image 103*a* is set as appropriate.

The user adjusts the adjustment image width AW of the first adjustment image 101*a* using the remote controller 90. When the user operates an enlargement button or a reduction button among the operation buttons 91 of the remote controller 90, an adjustment signal is transmitted from the remote controller 90 to the receiver 9. The enlargement button and the reduction button are not shown. The enlargement button is a button for instructing enlargement of the adjustment image width AW of the first adjustment image 101*a*. The reduction button is a button for instructing reduction of the adjustment image width AW of the first adjustment image 101*a*. Adjustment operation performed using the enlargement button or the reduction button by the user corresponds to an example of the first operation. The user adjusts an operation amount of the enlargement button or the reduction button to thereby adjust a change amount of the adjustment image width AW. The operation amount is adjusted according to a depression time and the number of times of depression of the operation buttons 91. The operation amount is included in the adjustment signal.

The receiver 9 receives the adjustment signal. The receiver 9 corresponds to an example of the input device. The reception of the adjustment signal corresponds to an example of the receiving the first operation. The receiver 9 transmits the adjustment signal to the OSD controller 51 and the data processor 53. The OSD controller 51 changes ratio data according to the adjustment signal. The ratio data is explained below. The OSD controller 51 changes the ratio data to thereby enlarge or reduce the adjustment image width AW. The adjustment image width AW corresponds to an example of the second length.

Figure 8:
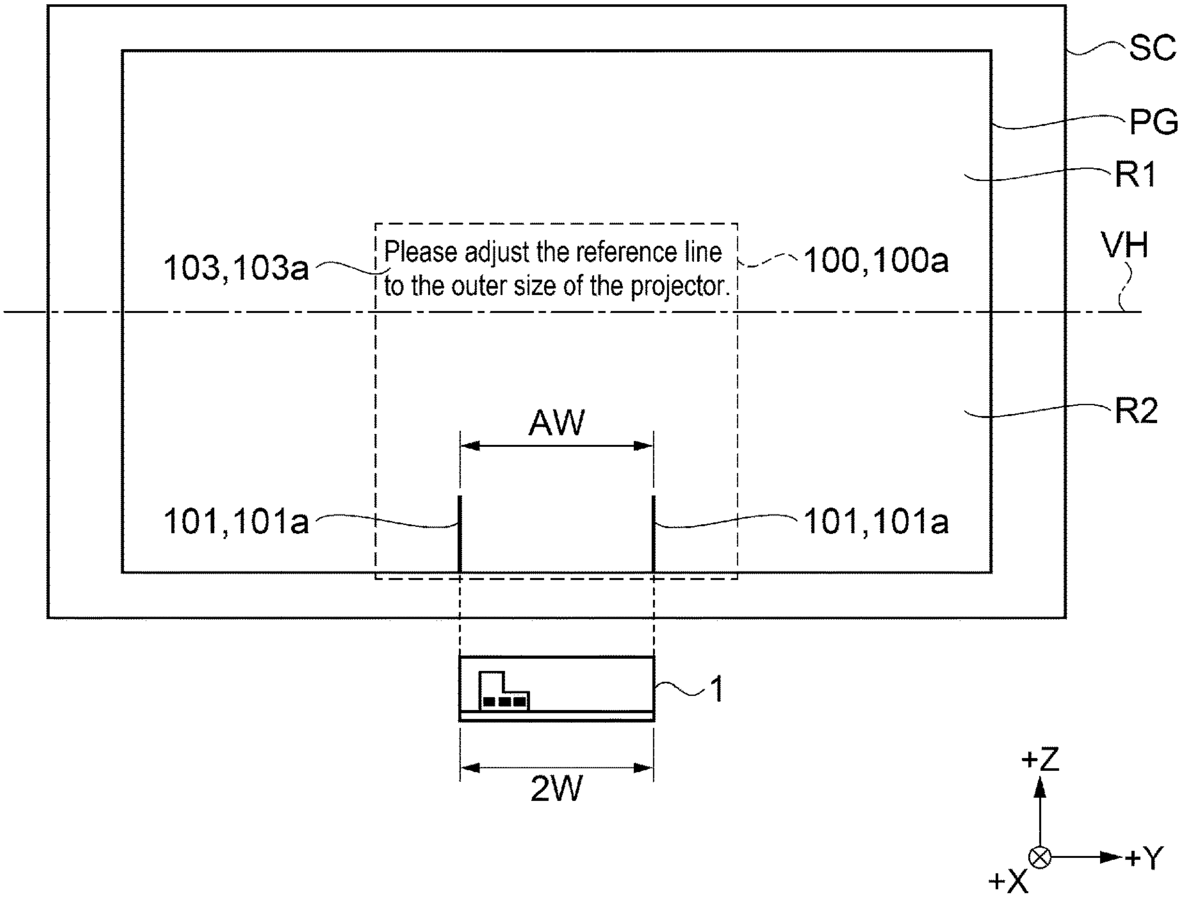
FIG. 8 is a diagram showing an example of the projection image including the OSD image.

FIG. 8 shows an example of the projection image PG including the OSD image 100. FIG. 8 shows the projection image PG projected onto the projection surface SC. The projection image PG is projected by the projector 1 disposed in a position in the −Z direction of the projection surface SC. The projector 1 is disposed below the projection surface SC. FIG. 8 shows a state at the time when the user matches or substantially matches the adjustment image width AW of the first adjustment image 101*a* to the exterior width 2W of the projector 1. The exterior width 2W of the projector 1 coincides with the width along the Y axis of the exterior housing 2. When the user operates the enlargement button or the reduction button of the remote controller 90, the remote controller 90 transmits the adjustment signal to the receiver 9. The receiver 9 receives the adjustment signal. The OSD controller 51 adjusts the adjustment image width AW based on the reference value and the adjustment signal.

After matching or substantially matching the adjustment image width AW to the exterior width 2W of the projector 1 as shown in FIG. 8, the user operates a determination button among the operation buttons 91. When the user operates the determination button, a determination signal corresponding to the determination button is transmitted from the remote controller 90 to the receiver 9. The receiver 9 receives the determination signal. The receiver 9 transmits the determination signal to the OSD controller 51. When receiving the determination signal, the OSD controller 51 determines that the adjustment image width AW has been adjusted to an adjustment value by the user. When determining that the adjustment image width AW is the adjustment value, the OSD controller 51 transmits changed ratio data to the data processor 53. The adjustment value corresponds to an example of the second value. When the adjustment value is a value coinciding or substantially coinciding with the exterior width 2W, the adjustment value is a designated value assumed in advance. The exterior width 2W corresponds to an example of the case length.

The data processor 53 receives ratio data at the time when the determination signal is transmitted. The data processor 53 calculates size data based on the reference value and the ratio data. The data processor 53 reads the reference value from the memory 7 in advance.

The ratio data is a ratio of a size of the adjustment image 101 projected onto the projection surface SC to a size of the projection image PG projected onto the projection surface SC. As an example, the ratio data is a width ratio of the adjustment image width AW of the first adjustment image 101*a* to the image width PW of the projection image PG. The ratio data may be a height ratio of an adjustment image height of the first adjustment image 101*a* to the image height PH of the projection image PG. When the user transmits the adjustment signal, the OSD controller 51 changes the ratio data according to the adjustment signal. As an example, the data processor 53 calculates the diagonal line length Y, which is an example of the size data, using Expression (1) described below.

$$Y = \sqrt{(cX)^2 \times \left(1 + \left(\frac{b}{a}\right)^2\right)} \quad (1)$$

Here, “c” is the ratio data. When the adjustment image 101 is the first adjustment image 101*a*, the width ratio is used as the ratio data. “x” is a reference value. The reference value is an actual size value of the exterior width 2W of the projector 1. The actual size value of the exterior width 2W is stored in the memory 7 in advance as the reference value. “a” and “b” are values representing an aspect ratio.

When receiving the determination signal, the data processor 53 can calculate the diagonal line length Y by substituting the ratio data in Expression (1). The data processor 53 outputs the diagonal line length Y or a value obtained by converting the diagonal line length Y to the OSD controller 51, the image provision device 500, and the like as information indicating size data. The data processor 53 outputs the information indicating the size data based on the reference value and the adjustment signal including the operation amount.

The reference value of the ratio data is set to a value with which the length of the projection image PG is a predetermined length. When the adjustment image width AW is a designated value coinciding with the exterior width 2W, as an example, the reference value of the ratio data is set to a value with which the diagonal line length Y is 100 inches. The reference value of the ratio data is a value obtained by dividing the designated value by 100 inches. The reference value of the ratio data is set as appropriate.

The data processor 53 may use a known dimension of a comparative object such as the width of the remote controller 90, the width of a member configuring a part of the projector 1, and a size of a face of a person, as a reference value. In this case, the user matches or substantially matches the adjustment image width AW and the dimension of the comparative object. When receiving the determination signal, the OSD controller 51 determines that the adjustment image width AW has been adjusted to the adjustment value. The OSD controller 51 transmits, to the data processor 53, ratio data at the time when the adjustment image width AW is adjusted to the adjustment value. The data processor 53 calculates size data using the ratio data.

The data processor 53 may calculate the image width PW as the size data instead of the diagonal line length Y. The image width PW is calculated by multiplying together the ratio data at the time when it is determined that the adjustment image width AW has been adjusted to the adjustment value and the reference value.

Information indicating the size data is transmitted to the OSD controller 51, the image provision device 500, and the like. The OSD controller 51 receives the information indicating the size data. The OSD controller 51 displays a size of the projection image PG using the information indicating the size data. The OSD controller 51 may adjust the size of the OSD image 100 using the information indicating the size data. The image provision device 500 receives the information indicating the size data. The image provision device 500 may correct, using the information indicating the size data, the image data transmitted to the projector 1. The OSD controller 51 and the image provision device 500 perform control as appropriate using the information indicating the size data.

Figure 9:
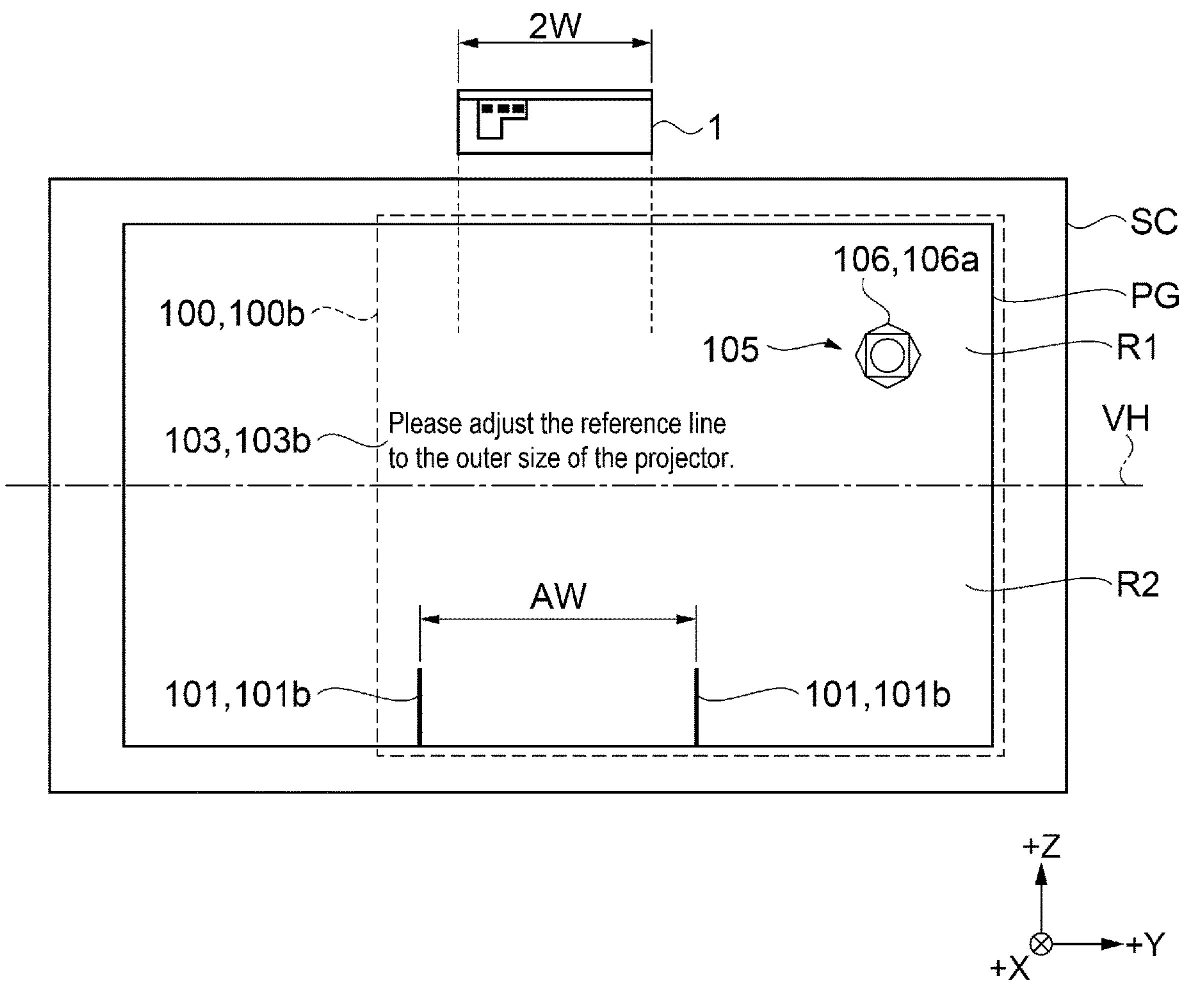
FIG. 9 is a diagram showing an example of the projection image including the OSD image.

FIG. 9 shows an example of the projection image PG including the OSD image 100. FIG. 9 shows the projection image PG projected onto the projection surface SC. The projection image PG is projected by the projector 1 disposed in a position in the +Z direction of the projection surface SC. The projector 1 is disposed above the projection surface SC. The projection image PG shown in FIG. 9 includes a second OSD image 100*b*, which is an example of the OSD image 100. An aspect ratio of the projection image PG shown in FIG. 9 is a:b. The second OSD image 100*b* shown in FIG. 9 includes a second adjustment image 101*b*, a second message image 103*b*, and a remote controller button icon 105. FIG. 9 shows the imaginary horizontal line VH.

The second adjustment image 101*b* is an example of the adjustment image 101. The second adjustment image 101*b* has the same configuration as the configuration of the first adjustment image 101*a* shown in FIGS. 7 and 8. In FIG. 9, the second adjustment image 101*b* is displayed in the second region R2. The projector 1 is disposed above the projection surface SC. The user is in a state in which it is difficult for the user to execute operation for accurately matching the adjustment image width AW to the exterior width 2W.

The second message image 103*b* is an example of the message image 103. The second message image 103*b* is the same as the first message image 103*a* shown in FIGS. 7 and 8. The second message image 103*b* is a message for requesting to match the adjustment image width AW to the exterior width 2W of the projector 1.

The remote controller button icon 105 is an icon corresponding to a part of the plurality of operation buttons 91 provided in the remote controller 90. The remote controller button icon 105 indicates the operation button 91 usable by the user. The remote controller button icon 105 can be set to display or non-display by operation of the user. The remote controller button icon 105 shown in FIG. 9 relates to operation for changing a display position of the second adjustment image 101*b*. The remote controller button icon 105 includes a plurality of operation button icons 106.

The operation button icons 106 correspond to the operation buttons 91 provided in the remote controller 90. When the user performs input operation on the operation button icon 106 or a position change button corresponding to the operation button icon 106, the display position of the second adjustment image 101*b* is changed. The position change button is included in the plurality of operation buttons 91. The operation button icon 106 is selected by the user operating the remote controller 90 and is subjected to input operation. The input operation on the operation button icon 106 or the position change button corresponds to an example of the second operation. When the user performs the input operation on the operation button icon 106 or the position change button, the receiver 9 receives a position change signal. The OSD controller 51 receives the position change signal via the receiver 9. The OSD controller 51 receiving the position change signal corresponds to an example of the receiving the second operation.

As an example, when the user performs the input operation on a first operation button icon 106*a* among the plurality of operation button icons 106, the display position of the second adjustment image 101*b* is changed to a position in the +Z direction. Alternatively, when the user performs the input operation on the position change button corresponding to the first operation button icon 106*a*, the display position of the second adjustment image 101*b* is changed to a position in the +Z direction.

Figure 10:
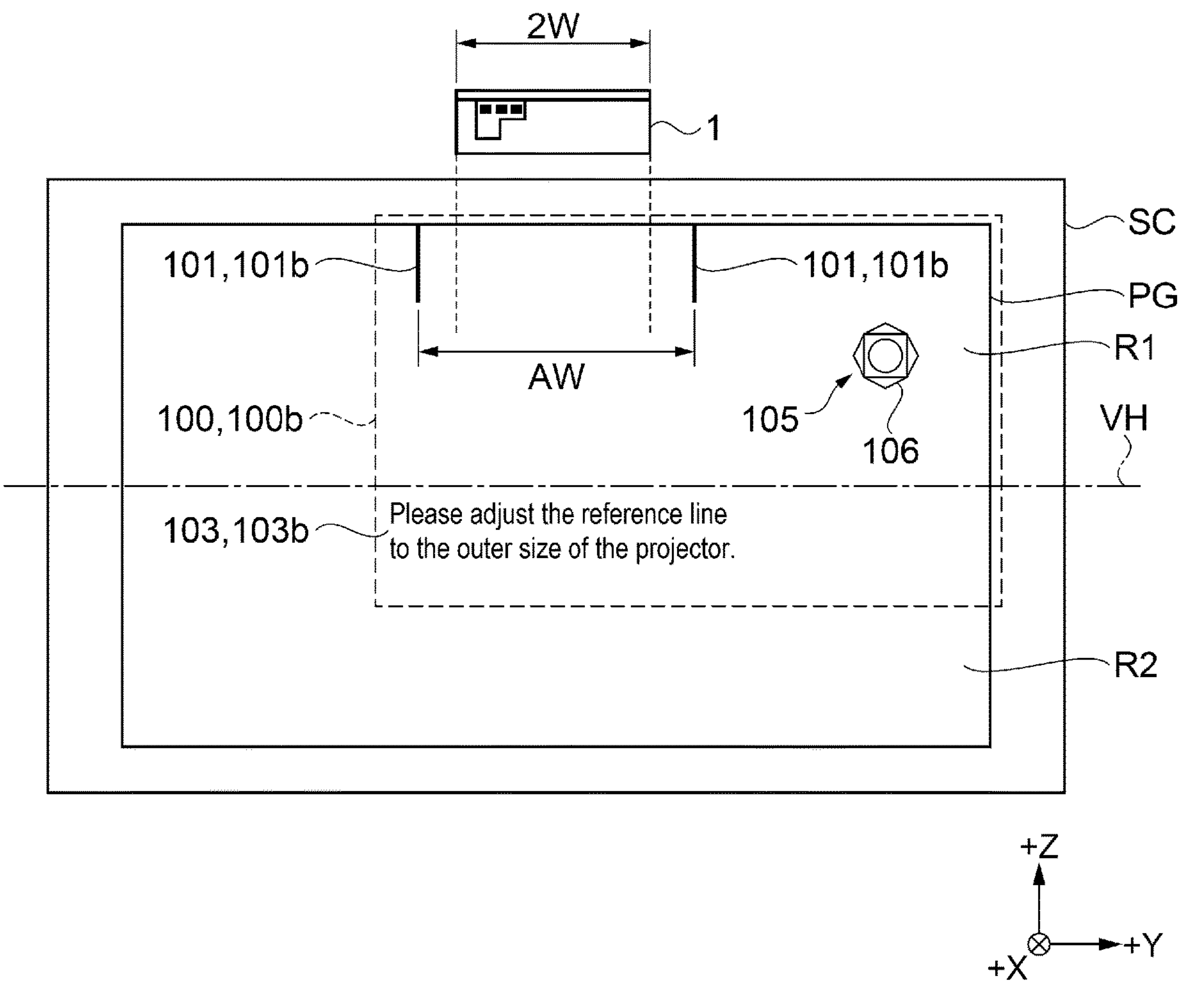
FIG. 10 is a diagram showing an example of the projection image including the OSD image.

FIG. 10 shows an example of the projection image PG including the OSD image 100. FIG. 10 shows the projection image PG projected onto the projection surface SC. The projection image PG is projected by the projector 1 disposed in a position in the +Z direction of the projection surface SC. The projector 1 is disposed above the projection surface SC. The projection image PG shown in FIG. 10 includes the second OSD image 100*b*. An aspect ratio of the projection image PG shown in FIG. 10 is a:b. FIG. 10 shows a state at the time when a display position of the second adjustment image 101*b* is changed.

When receiving the position change signal, the OSD controller 51 changes the display position of the second adjustment image 101*b*. The second adjustment image 101*b* is displayed in the first region R1 based on the position change signal. When the projection image PG is horizontally equally divided into two, the second adjustment image 101*b* is disposed in a region close to the projector 1. The second adjustment image 101*b* shown in FIG. 10 is vertically reversely displayed. The second adjustment image 101*b* is displayed in the first region R1, whereby the second adjustment image 101*b* approaches the projector 1. It is easy for the user to compare the adjustment image width AW of the second adjustment image 101*b* and the exterior width 2W.

The OSD controller 51 changes the display position of the second adjustment image 101*b* based on the position change signal in FIG. 10 but is not limited to this. The OSD controller 51 may change the display position of the second adjustment image 101*b* based on installation information of the projector 1. The installation information is stored in the memory 7 in advance. The installation information includes position information where the projector 1 is installed with respect to the projection surface SC or information concerning a direction of the projection image PG.

When the projection image PG is horizontally equally divided into two, the second adjustment image 101*b* may be disposed in a region close to the exterior housing 2 of the projector 1.

It is easy for the user to perform operation for matching the adjustment image width AW of the second adjustment image 101*b* to the exterior width 2W of the projector 1.

The OSD controller 51 executes receiving, via the receiver 9, a position change signal for changing a display position of the second adjustment image 101*b* and changing, based on the position change signal, the display position of the second adjustment image 101*b* in the projection image PG.

The user is capable of bringing the display position of the second adjustment image 101*b* close to the projector 1. It is easy for the user to adjust the adjustment image width AW.

Figure 11:
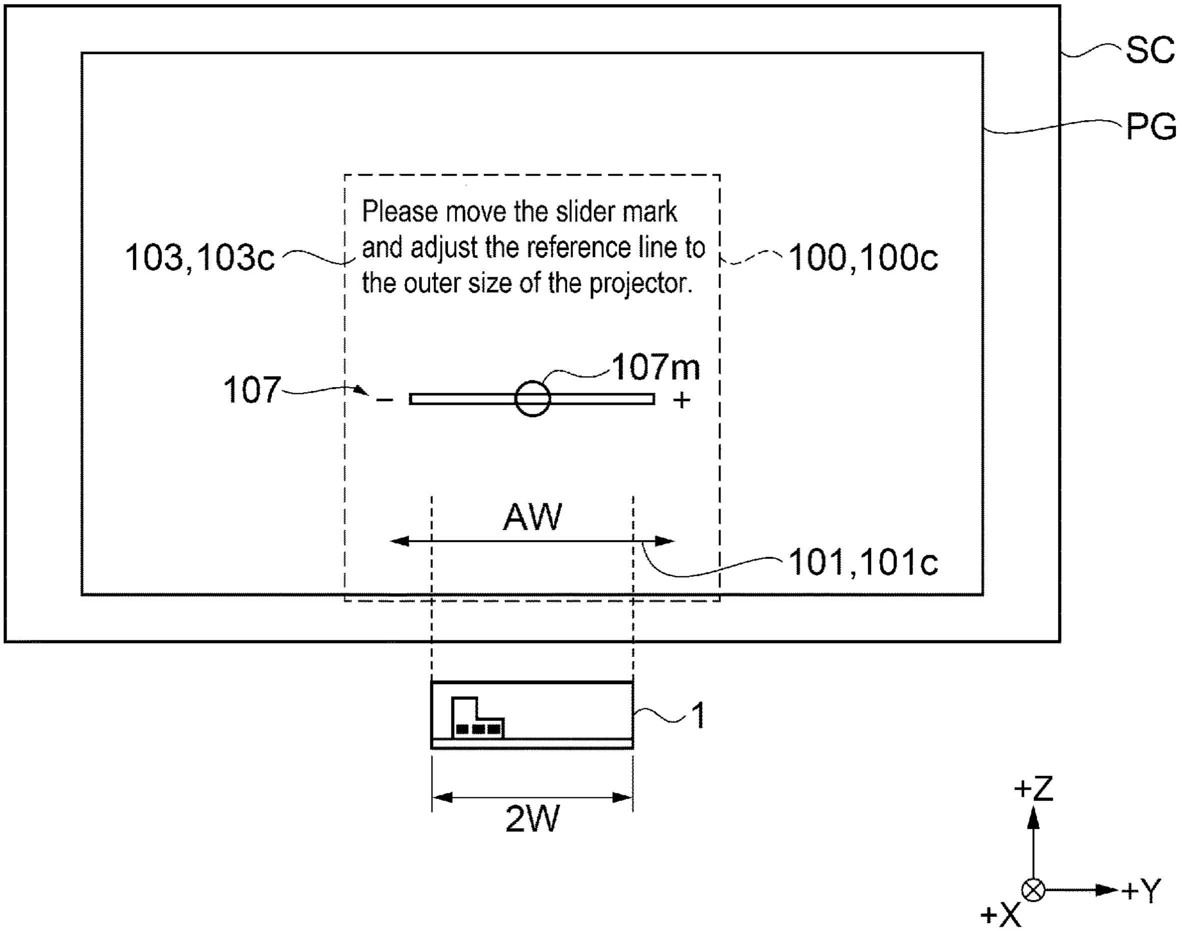
FIG. 11 is a diagram showing an example of the projection image including the OSD image.

FIG. 11 shows an example of the projection image PG including the OSD image 100. FIG. 11 shows the projection image PG projected onto the projection surface SC. The projection image PG is projected by the projector 1 disposed in a position in the −Z direction of the projection surface SC. The projector 1 is disposed below the projection surface SC. The projection image PG shown in FIG. 11 includes a third OSD image 100*c*, which is an example of the OSD image 100. An aspect ratio of the projection image PG shown in FIG. 11 is a:b. The third OSD image 100*c* shown in FIG. 11 includes a third adjustment image 101*c*, a third message image 103*c*, and a slider image 107.

The third adjustment image 101*c* is an example of the adjustment image 101. The third adjustment image 101*c* is an image, the adjustment image width AW of which is adjusted by the user. The third adjustment image 101*c* is formed by a straight line extending along the Y axis. The straight line has arrow marks at both ends. The width of the straight line along the Y axis corresponds to the adjustment image width AW. When the projection image PG is horizontally equally divided into two, the third adjustment image 101*c* is disposed in a region close to the projector 1.

The third message image 103*c* is an example of the message image 103. The third message image 103*c* is an image for displaying information notified to the user. The third message image 103*c* is a message for urging the user to adjust the adjustment image width AW using the slider image 107. The third message image 103*c* represents the third adjustment image 101*c* as a reference line. The third message image 103*c* is a message for requesting to match the adjustment image width AW to the exterior width 2W of the projector 1.

The slider image 107 changes the adjustment image width AW of the third adjustment image 101*c*. The slider image 107 includes a slider mark 107*m*. The user moves the slider mark 107*m* in the +Y direction or the −Y direction using the remote controller 90. The OSD controller 51 enlarges or reduces the adjustment image width AW according to a display position of the slider mark 107*m*. The user can match or substantially match the adjustment image width AW of the third adjustment image 101*c* to the exterior width 2W of the projector 1 using the slider image 107. The OSD controller 51 has a function of receiving input operation of the user at this time.

Figure 12:
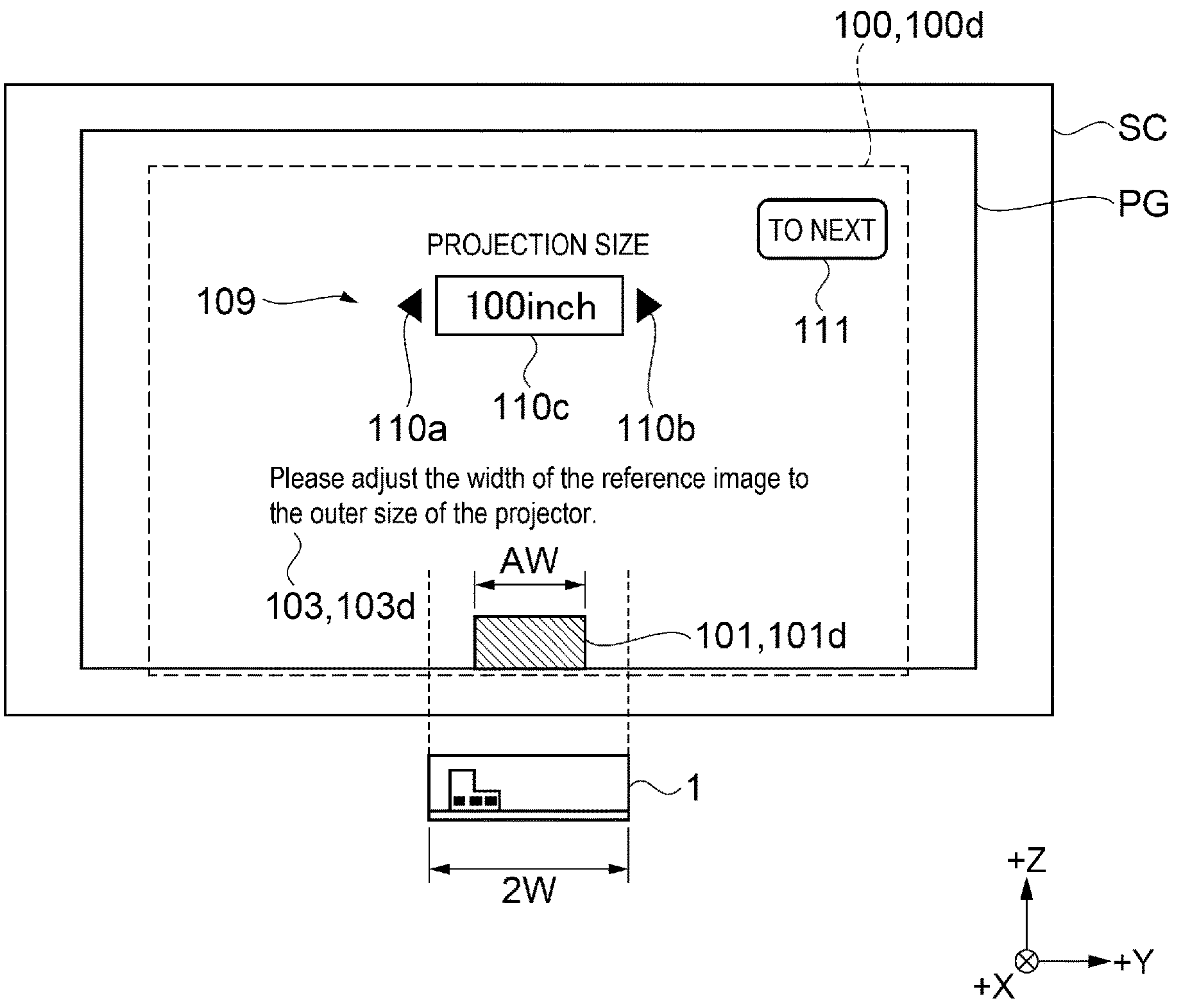
FIG. 12 is a diagram showing an example of the projection image including the OSD image.

FIG. 12 shows an example of the projection image PG including the OSD image 100. FIG. 12 shows the projection image PG projected onto the projection surface SC. The projection image PG is projected by the projector 1 disposed in a position in the −Z direction of the projection surface SC. The projector 1 is disposed below the projection surface SC. The projection image PG shown in FIG. 12 includes a fourth OSD image 100*d*, which is an example of the OSD image 100. An aspect ratio of the projection image PG shown in FIG. 12 is a:b. The fourth OSD image 100*d* shown in FIG. 12 includes a fourth adjustment image 101*d*, a fourth message image 103*d*, a size adjustment image 109, and a screen transition instruction icon 111.

The fourth adjustment image 101*d* is an example of the adjustment image 101. The fourth adjustment image 101*d* is an image, the adjustment image width AW of which is adjusted by the user. The fourth adjustment image 101*d* is a figure of a rectangle. The width of the rectangle along the Y axis corresponds to the adjustment image width AW. When the projection image PG is horizontally equally divided into two, the fourth adjustment image 101*d* is disposed in a region close to the projector 1.

The fourth message image 103*d* is an example of the message image 103. The fourth message image 103*d* is an image for displaying information to be notified to the user. The fourth message image 103*d* is a message for urging the user to adjust the adjustment image width AW. The fourth message image 103*d* represents the fourth adjustment image 101*d* as a reference image. The fourth message image 103*d* is a message for requesting to match the adjustment image width AW to the exterior width 2W of the projector 1.

The size adjustment image 109 receives input operation for enlarging or reducing the adjustment image width AW of the fourth adjustment image 101*d*. The size adjustment image 109 includes a first size adjustment icon 110*a*, a second size adjustment icon 110*b*, and a size display field 110*c*.

The first size adjustment icon 110*a* receives input operation by the user. When the user performs input operation on the first size adjustment icon 110*a* using the remote controller 90, the OSD controller 51 reduces the adjustment image width AW of the fourth adjustment image 101*d*. When the user performs input operation on a reduction button corresponding to the first size adjustment icon 110*a*, the OSD controller 51 may reduce the adjustment image width AW of the fourth adjustment image 101*d*. The reduction button is included in the plurality of operation buttons 91 provided in the remote controller 90.

The second size adjustment icon 110*b* receives input operation by the user. When the user performs input operation on the second size adjustment icon 110*b* using the remote controller 90, the OSD controller 51 enlarges the adjustment image width AW of the fourth adjustment image 101*d*. When the user performs input operation on an enlargement button corresponding to the second size adjustment icon 110*b*, the OSD controller 51 may enlarge the adjustment image width AW of the fourth adjustment image 101*d*. The enlargement button is included in the plurality of operation buttons 91 provided in the remote controller 90.

The size display field 110*c* displays a size of the projection image PG. When the user performs input operation on the first size adjustment icon 110*a* or the second size adjustment icon 110*b*, the OSD controller 51 acquires an adjustment signal. The adjustment signal includes an operation amount by the user. The OSD controller 51 transmits the adjustment signal to the data processor 53. The data processor 53 receives the adjustment signal and calculates size data based on the adjustment signal. The data processor 53 outputs information indicating the size data to the OSD controller 51. The OSD controller 51 acquires the information indicating the size data and causes the size display field 110*c* to display the size data. The size display field 110*c* shown in FIG. 12 displays the diagonal line length Y of the projection image PG in inch as the size data. The size display field 110*c* corresponds to an example of the fourth image.

The outputting the information indicating the size data includes projecting the size display field 110*c* indicating the size data onto the projection surface SC using the image projection device 3.

The user can recognize the size of the projection image PG by checking the size display field 110*c*.

The screen transition instruction icon 111 receives an instruction to change various images to be displayed on the fourth OSD image 100*d*. When the user performs input operation on the screen transition instruction icon 111 using the remote controller 90, the OSD controller 51 changes the various images to be displayed on the fourth OSD image 100*d*. The OSD controller 51 may erase the fourth OSD image 100*d*. When the user performs input operation on the screen transition instruction icon 111, the adjustment processing for the adjustment image width AW by the user ends.

Figure 13:
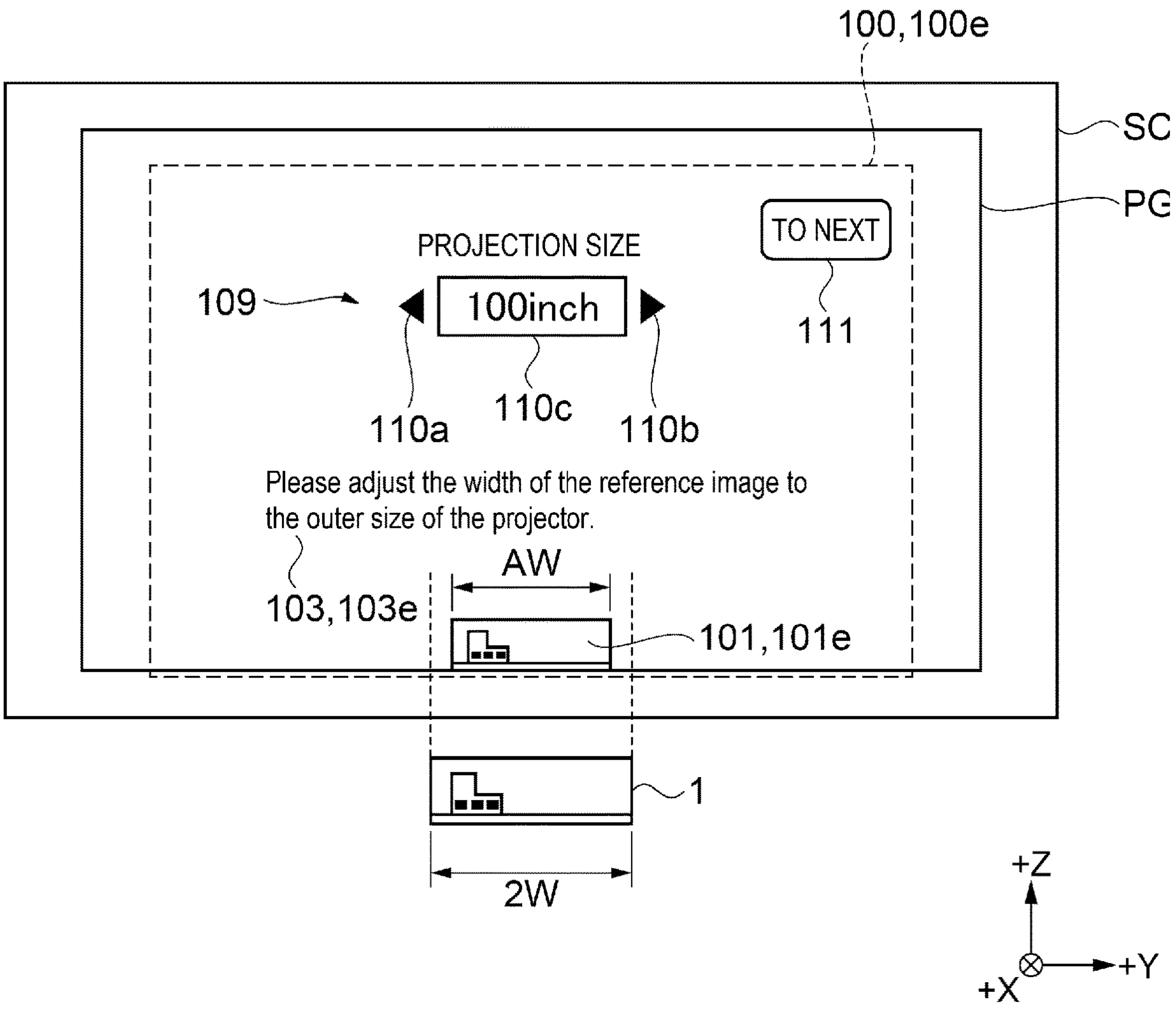
FIG. 13 is a diagram showing an example of the projection image including the OSD image.

FIG. 13 shows an example of the projection image PG including the OSD image 100. FIG. 13 shows the projection image PG projected onto the projection surface SC. The projection image PG is projected by the projector 1 disposed in a position in the −Z direction of the projection surface SC. The projector 1 is disposed below the projection surface SC. The projection image PG shown in FIG. 13 includes a fifth OSD image 100*e*, which is an example of the OSD image 100. An aspect ratio of the projection image PG shown in FIG. 13 is a:b. The fifth OSD image 100*e* shown in FIG. 13 includes a fifth adjustment image 101*e*, a fifth message image 103*e*, the size adjustment image 109, and the screen transition instruction icon 111.

The fifth adjustment image 101*e* is an example of the adjustment image 101. The fifth adjustment image 101*e* is an image, the adjustment image width AW of which is adjusted by the user. The fifth adjustment image 101*e* is an image picture showing the exterior housing 2 of the projector 1. The adjustment image 101 is not limited to a figure. The image picture may be used as the adjustment image 101. The width along the Y axis of the image picture corresponds to the adjustment image width AW. When the projection image PG is horizontally equally divided into two, the fifth adjustment image 101*e* is disposed in a region close to the projector 1.

The fifth message image 103*e* included in the fifth OSD image 100*e* is the same as the fourth message image 103*d* shown in FIG. 12. The fifth message image 103*e* may include a message different from the fourth message image 103*d*.

The size adjustment image 109 and the screen transition instruction icon 111 included in the fifth OSD image 100*e* are the same as the size adjustment image 109 and the screen transition instruction icon 111 shown in FIG. 12. The fifth OSD image 100*e* may include the slider image 107 shown in FIG. 11 instead of the size adjustment image 109. The fifth OSD image 100*e* may not display the screen transition instruction icon 111.

Figure 14:
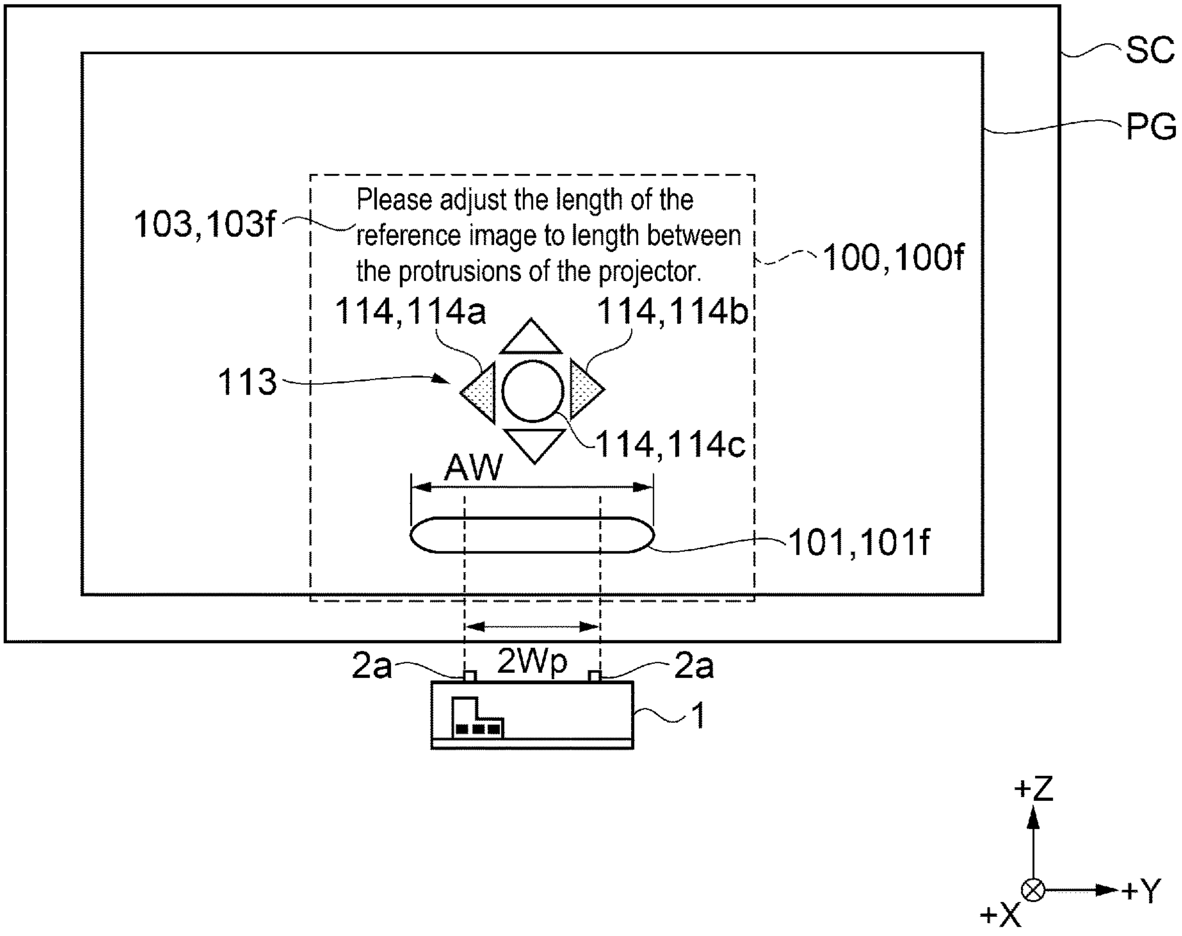
FIG. 14 is a diagram showing an example of the projection image including the OSD image.

FIG. 14 shows an example of the projection image PG including the OSD image 100. FIG. 14 shows the projection image PG projected onto the projection surface SC. The projection image PG is projected by the projector 1 disposed in a position in the −Z direction of the projection surface SC. The projector 1 is disposed below the projection surface SC. The projection image PG shown in FIG. 14 includes a sixth OSD image 100*f*, which is an example of the OSD image 100. An aspect ratio of the projection image PG shown in FIG. 14 is a:b. The sixth OSD image 100*f* shown in FIG. 14 includes a sixth adjustment image 101*f*, a sixth message image 103*f*, and a width change operation image 113.

The projector 1 shown in FIG. 14 includes two width adjusting members 2*a*. The two width adjusting members 2*a* are protrusions provided on the exterior housing 2. The two width adjusting members 2*a* are disposed at an interval of a partial exterior width 2Wp along the Y axis. The width adjusting members 2*a* are used as a reference when the user adjusts the width of the sixth adjustment image 101*f*. The user matches or substantially matches the adjustment image width AW of the sixth adjustment image 101*f* to the partial exterior width 2Wp. The shape of the width adjusting members 2*a* is not limited to a protrusion. The shape of the width adjusting members 2*a* is not limited if the shape is a shape with which the user can adjust the adjustment image width AW.

The sixth adjustment image 101*f* is an example of the adjustment image 101. The sixth adjustment image 101*f* is an image, the adjustment image width AW of which is adjusted by the user. The first adjustment image 101*a* is formed by an ellipse having a long diameter along the Y axis. The width of the ellipse along the Y axis corresponds to the adjustment image width AW. When the projection image PG is horizontally equally divided into two, the sixth adjustment image 101*f* is disposed in a region close to the projector 1.

The sixth message image 103*f* is an example of the message image 103. The sixth message image 103*f* is an image for displaying information to be notified to the user. The sixth message image 103*f* is a message for urging the user to adjust the adjustment image width AW. The sixth message image 103*f* represents the sixth adjustment image 101*f* as a reference image. The sixth message image 103*f* is a message for requesting to match the adjustment image width AW to the partial exterior width 2Wp.

The width change operation image 113 receives input operation for enlarging or reducing the adjustment image width AW of the sixth adjustment image 101*f*. The width change operation image 113 includes a first width adjustment icon 114*a*, a second width adjustment icon 114*b*, and a determination button icon 114*c*. The first width adjustment icon 114*a*, the second width adjustment icon 114*b*, and the determination button icon 114*c* respectively correspond to the reduction button, the enlargement button, and the determination button included in the remote controller 90. The reduction button, the enlargement button, and the determination button are included in the plurality of operation buttons 91. The input operation to the width change operation image 113 by the user corresponds to the input operation to the remote controller 90.

The first width adjustment icon 114*a* receives the input operation by the user. When the user performs the input operation on the first width adjustment icon 114*a* using the remote controller 90, the OSD controller 51 reduces the adjustment image width AW of the sixth adjustment image 101*f*.

The second width adjustment icon 114*b* receives the input operation by the user. When the user performs the input operation on the second width adjustment icon 114*b* using the remote controller 90, the OSD controller 51 enlarges the adjustment image width AW of the sixth adjustment image 101*f*.

The determination button icon 114*c* receives the input operation by the user. When the user performs the input operation on the determination button icon 114*c* using the remote controller 90, the OSD controller 51 acquires a determination signal.

The user adjusts the adjustment image width AW of the sixth adjustment image 101*f* using the width change operation image 113. When the user performs the input operation on the first width adjustment icon 114*a* or the second width adjustment icon 114*b*, an adjustment signal is transmitted to the OSD controller 51. The user adjusts an operation amount on the first width adjustment icon 114*a* or the second width adjustment icon 114*b* to thereby adjust a change amount of the adjustment image width AW. The operation amount is adjusted according to an operation time and the number of times of operation on the first width adjustment icon 114*a* or the second width adjustment icon 114*b*. The operation amount is included in the adjustment signal.

The OSD controller 51 acquires the adjustment signal. The reception of the adjustment signal corresponds to an example of the receiving the first operation. The OSD controller 51 changes the ratio data according to the adjustment signal. The OSD controller 51 changes the ratio data to thereby enlarge or reduce the adjustment image width AW.

When the adjustment image width AW has been matched or substantially matched to the partial exterior width 2Wp, the user performs the input operation on the determination button icon 114*c*. When the user performs the input operation on the determination button icon 114*c*, the OSD controller 51 acquires a determination signal. When the determination signal is acquired, the OSD controller 51 determines that the adjustment image width AW has been adjusted to the adjustment value by the user. When determining that the adjustment image width AW has been adjusted to the adjustment value, the OSD controller 51 transmits the changed ratio data to the data processor 53. The adjustment value corresponds to an example of the second value. When the adjustment value is a value coinciding or substantially coinciding with the partial exterior width 2Wp, the adjustment value is the designated value assumed in advance. The partial exterior width 2Wp corresponds to an example of the case length.

The data processor 53 receives the ratio data at the time when the determination signal is transmitted. The data processor 53 calculates size data based on a reference value and the ratio data. The reference value is an actual size value of the partial exterior width 2Wp between the two width adjusting members 2*a*. The actual size value of the partial exterior width 2Wp is stored in the memory 7 in advance. The actual size value of the partial exterior width 2Wp is a known value.

The projector 1 includes the exterior housing 2 that houses at least a part of the image projection device 3 and the control device 5. The adjustment value corresponds to the partial exterior width 2Wp of the width adjusting members 2*a*, which is a part of the length of the exterior housing 2. The projection image PG includes the sixth message image 103*f* for requesting the user to match the adjustment image width AW of the sixth adjustment image 101*f* and the partial exterior width 2Wp.

The user can grasp that the user should match the partial exterior width 2Wp of the width adjusting members 2*a*, which are a part of the exterior housing 2, and the adjustment image width AW.

Figure 15:
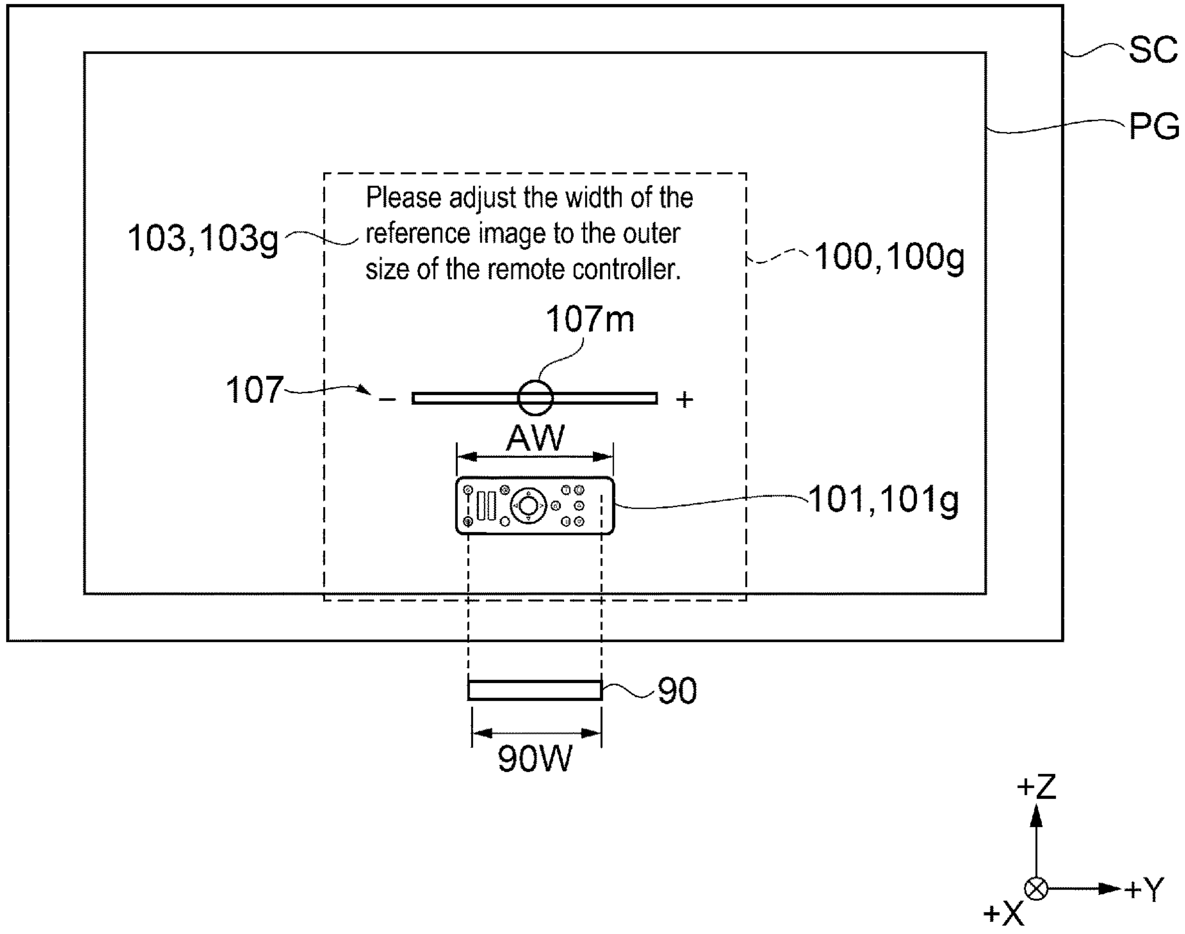
FIG. 15 is a diagram showing an example of the projection image including the OSD image.

FIG. 15 shows an example of the projection image PG including the OSD image 100. FIG. 15 shows the projection image PG projected onto the projection surface SC. The projection image PG is projected by the projector 1 disposed in a position in the −Z direction of the projection surface SC. The projector 1 is not shown in FIG. 15. The projection image PG shown in FIG. 15 includes a seventh OSD image 100*g*, which is an example of the OSD image 100. An aspect ratio of the projection image PG shown in FIG. 15 is a:b. The seventh OSD image 100*g* shown in FIG. 15 includes a seventh adjustment image 101*g*, a seventh message image 103*g*, and the slider image 107. The slider image 107 is the same as the slider image 107 shown in FIG. 11.

In FIG. 15, the remote controller 90 is disposed in a position adjacent to the projection surface SC. The remote controller 90 is used as a comparative object when the user adjusts the adjustment image width AW. The remote controller 90 has a remote controller width 90W along the Y axis. The remote controller width 90W corresponds to the exterior width 2W of the projector 1. The remote controller width 90W is used as a reference when the user adjusts the adjustment image width AW of the seventh adjustment image 101*g*. The user matches or substantially matches the adjustment image width AW of the seventh adjustment image 101*g* to the remote controller width 90W.

The seventh adjustment image 101*g* is an example of the adjustment image 101. The seventh adjustment image 101*g* is an image, the adjustment image width AW of which is adjusted by the user. The seventh adjustment image 101*g* is an image picture of the remote controller 90. The width of the image picture along the Y axis corresponds to the adjustment image width AW.

The seventh message image 103*g* is an example of the message image 103. The seventh message image 103*g* is an image for displaying information to be notified to the user. The seventh message image 103*g* is a message for urging the user to adjust the adjustment image width AW. The seventh message image 103*g* represents the seventh adjustment image 101*g* as a reference image. The seventh message image 103*g* is a message for requesting to match the adjustment image width AW to the remote controller width 90W of the remote controller 90.

The user adjusts the adjustment image width AW of the seventh adjustment image 101*g* using the slider image 107. When the user performs input operation on the slider mark 107*m*, an adjustment signal is transmitted to the OSD controller 51. The user adjusts an operation amount of the slider mark 107*m* to thereby adjust a change amount of the adjustment image width AW. The operation amount is adjusted according to a movement amount of the slider mark 107*m*. The operation amount is included in the adjustment signal.

The OSD controller 51 acquires the adjustment signal. The reception of the adjustment signal corresponds to an example of the receiving the first operation. The OSD controller 51 changes the ratio data according to the adjustment signal. The OSD controller 51 changes the ratio data to thereby enlarge or reduce the adjustment image width AW.

When the adjustment image width AW has been matched or substantially matched to the remote controller width 90W, the user performs the input operation on the determination button among the operation buttons 91. When the user performs the input operation on the determination button, the OSD controller 51 acquires a determination signal. When acquiring the determination signal, the OSD controller 51 determines that the adjustment image width AW has been adjusted to the adjustment value by the user. When determining that the adjustment image width AW has been adjusted to the adjustment value, the OSD controller 51 transmits the changed ratio data to the data processor 53. When the adjustment value is a value coinciding or substantially coinciding with the remote controller width 90W, the adjustment value is the designated value assumed in advance. The remote controller width 90W corresponds to an example of the second length.

The data processor 53 receives the ratio data at the time when the determination signal is transmitted. The data processor 53 calculates size data based on a reference value and the ratio data. The reference value is an actual size value of the remote controller width 90W of the remote controller 90. The actual size value of the remote controller width 90W is stored in the memory 7 in advance. The actual size value of the remote controller width 90W is a known value. The data processor 53 outputs the size data or data obtained by converting the size data to the OSD controller 51 and the like as information indicating the size data.

Figure 16:
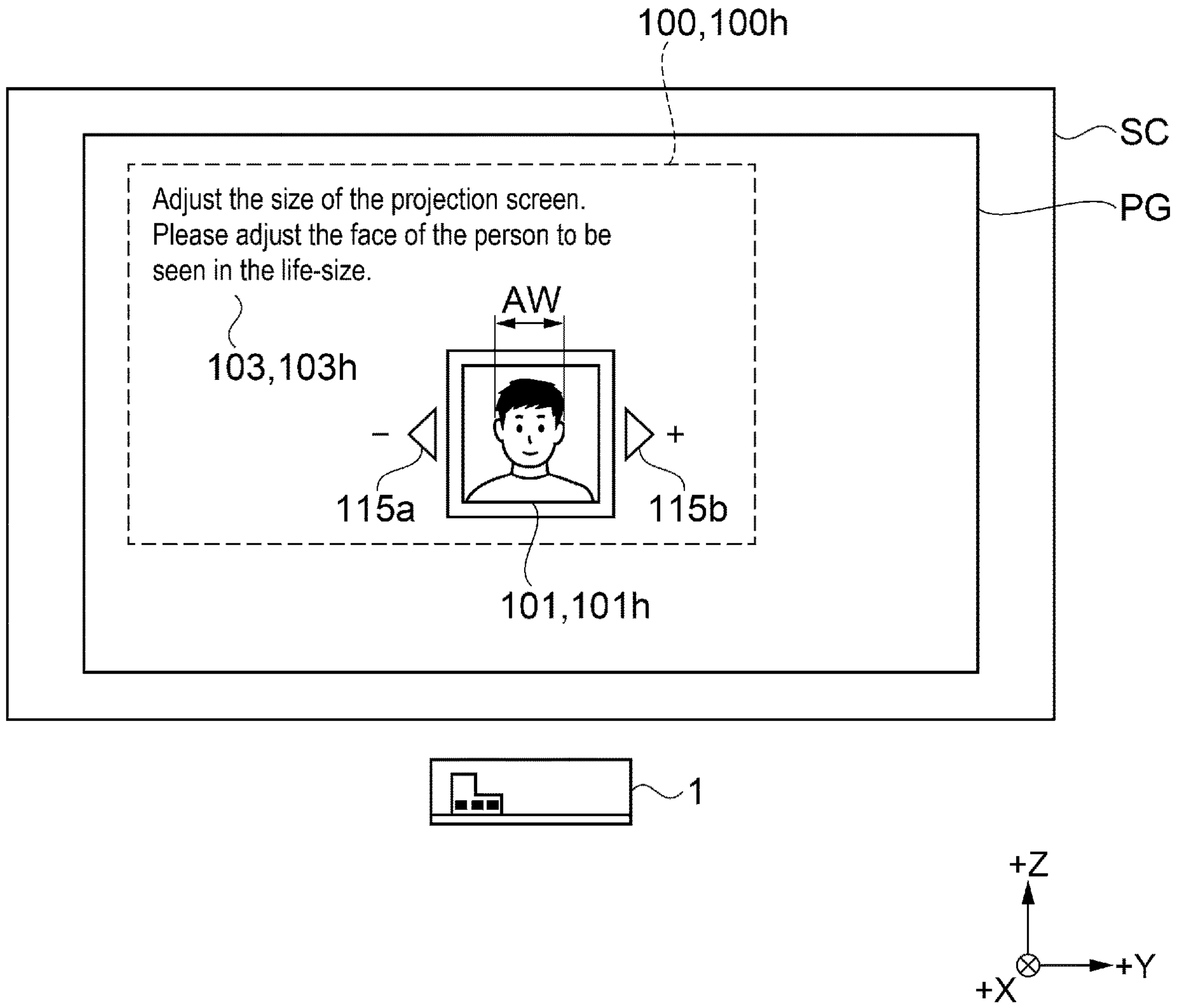
FIG. 16 is a diagram showing an example of the projection image including the OSD image.

FIG. 16 shows an example of the projection image PG including the OSD image 100. FIG. 16 shows the projection image PG projected onto the projection screen SC. The projection image PG is projected by the projector 1 disposed in a position in the −Z direction of the projection surface SC. The projection image PG shown in FIG. 16 includes an eighth OSD image 100*h*, which is an example of the OSD image 100. An aspect ratio of the projection image PG shown in FIG. 16 is a:b. The eighth OSD image 100*h* shown in FIG. 16 includes an eighth adjustment image 101*h*, an eighth message image 103*h*, a first image size change icon 115*a*, and a second image size change icon 115*b*.

The eighth adjustment image 101*h* is an example of the adjustment image 101. The eighth adjustment image 101*h* is an image, the adjustment image width AW of which is adjusted by the user. The eighth adjustment image 101*h* is a person image including a face of a person. The face of the person corresponds to an example of the target object. The width of the face along the Y axis shown in the person image is the adjustment image width AW. The width of the face along the Y axis corresponds to an example of the second length.

The person image is generated by imaging an actual person. The width of the face along the Y axis corresponds to an actual size of the face of the person. The user can bring a size of the face including the width along the Y axis close to the actual size by enlarging or reducing the person image. The user can match or substantially match the size of the face to the actual size by bringing the size of the face close to the actual size. The actual size corresponds to an example of the target object length.

The eighth adjustment image 101*h* shown in FIG. 16 shows the person image including the face of the person but is not limited to this. The eighth adjustment image 101*h* may include, instead of the face of the person, an animal, a part of the person such as a hand or a finger, or a structure such as an automobile. The eighth adjustment image 101*h* only has to be an image, an actual size of which is known to the user.

The eighth message image 103*h* is an example of the message image 103. The eighth message image 103*h* is an image for displaying information to be notified to the user. The eighth message image 103*h* is a message for urging the user to adjust the adjustment image width AW. The eighth message image 103*h* represents the actual size as a life-size. The eighth message image 103*h* is a message for requesting image size adjustment operation for bringing the adjustment image width AW close to the actual size of the face of the person. The image size adjustment operation corresponds to an example of the third operation. The eighth message image 103*h* corresponds to an example of the third image.

The first image size change icon 115*a* receives input operation by the user. When the user performs the input operation on the first image size change icon 115*a* using the remote controller 90, the OSD controller 51 reduces the adjustment image width AW of the eighth adjustment image 101*h*.

The second image size change icon 115*b* receives input operation by the user. When the user performs the input operation on the second image size change icon 115*b* using the remote controller 90, the OSD controller 51 enlarges the adjustment image width AW of the eighth adjustment image 101*h*.

The user adjusts the adjustment image width AW of the eighth adjustment image 101*h* using the remote controller 90. When the user performs the input operation on the first image size change icon 115*a* or the second image size change icon 115*b*, an adjustment signal is transmitted to the OSD controller 51. The user adjusts an operation amount on the first image size change icon 115*a* or the second image size change icon 115*b* to thereby adjust a change amount of the adjustment image width AW. The operation amount is adjusted according to an operation time and the number of times of operation on the first image size change icon 115*a* or the second image size change icon 115*b*. The operation amount is included in the adjustment signal.

The OSD controller 51 acquires the adjustment signal. The reception of the adjustment signal corresponds to an example of receiving the first operation. The OSD controller 51 changes the ratio data according to the adjustment signal. The OSD controller 51 changes the ratio data to thereby enlarge or reduce the adjustment image width AW.

The user performs image size adjustment operation using the first image size change icon 115*a* or the second image size change icon 115*b*. The user brings the adjustment image width AW close to an actual size to thereby match or substantially match the adjustment image width AW to the actual size. When the adjustment image width AW coincides or substantially coincides with the actual size, the user performs input operation on the determination button. The determination button is included in the operation buttons 91 of the remote controller 90. When the user performs the input operation on the determination button, the OSD controller 51 acquires a determination signal. When acquiring the determination signal, the OSD controller 51 determines that the adjustment image width AW has been adjusted to an adjustment value by the user. When determining that the adjustment image width AW has been adjusted to the adjustment value, the OSD controller 51 transmits the changed ratio data to the data processor 53. The adjustment value corresponds to an example of the second value. When the adjustment value is a value coinciding or substantially coinciding with the actual size, the adjustment value is the designated value assumed in advance.

The data processor 53 receives the ratio data at the time when the determination signal is transmitted. The data processor 53 calculates size data based on a reference value and the ratio data. The reference value is an actual size value of the width of the face of the person along the Y axis. The actual size value is stored in the memory 7 in advance. The actual size value is a known value.

The adjustment image width AW corresponds to the actual size of the face, which is a known length of the face of the person. The projection image PG includes the eighth message image 103*h* for requesting the user to perform image size change operation for bringing the adjustment image width AW of the eighth adjustment image 101*h* close to the actual size of the face.

The user can cause the projector 1 to calculate size data using the eighth adjustment image 101*h* including the face of the person, a size of which is known.

The projector 1 includes the image projection device 3 and the control device 5. The control device 5 executes projecting the projection image PG including the adjustment image 101 onto the projection surface SC using the image projection device 3, acquiring a reference value relating to the image width PW of the adjustment image 101 on the projection surface SC, and outputting, based on the reference value, information indicating size data corresponding to the image width PW of the projection image PG projected onto the projection surface SC, the image width PW being a value at the time when the adjustment image width AW on the projection surface SC is adjusted to the adjustment value.

The projector 1 is capable of calculating a size of the projection image PG without using a distance measurement sensor.

The projector 1 further includes the receiver 9. The control device 5 receiving, via the receiver 9, the adjustment operation for enlarging or reducing the adjustment image 101 and outputting the information indicating the size data means outputting the information indicating the size data based on the reference value and an operation amount of the adjustment operation until the adjustment image width AW is adjusted to the adjustment value.

The user performs the adjustment operation, whereby the projector 1 can calculate the size data.

Figure 17:
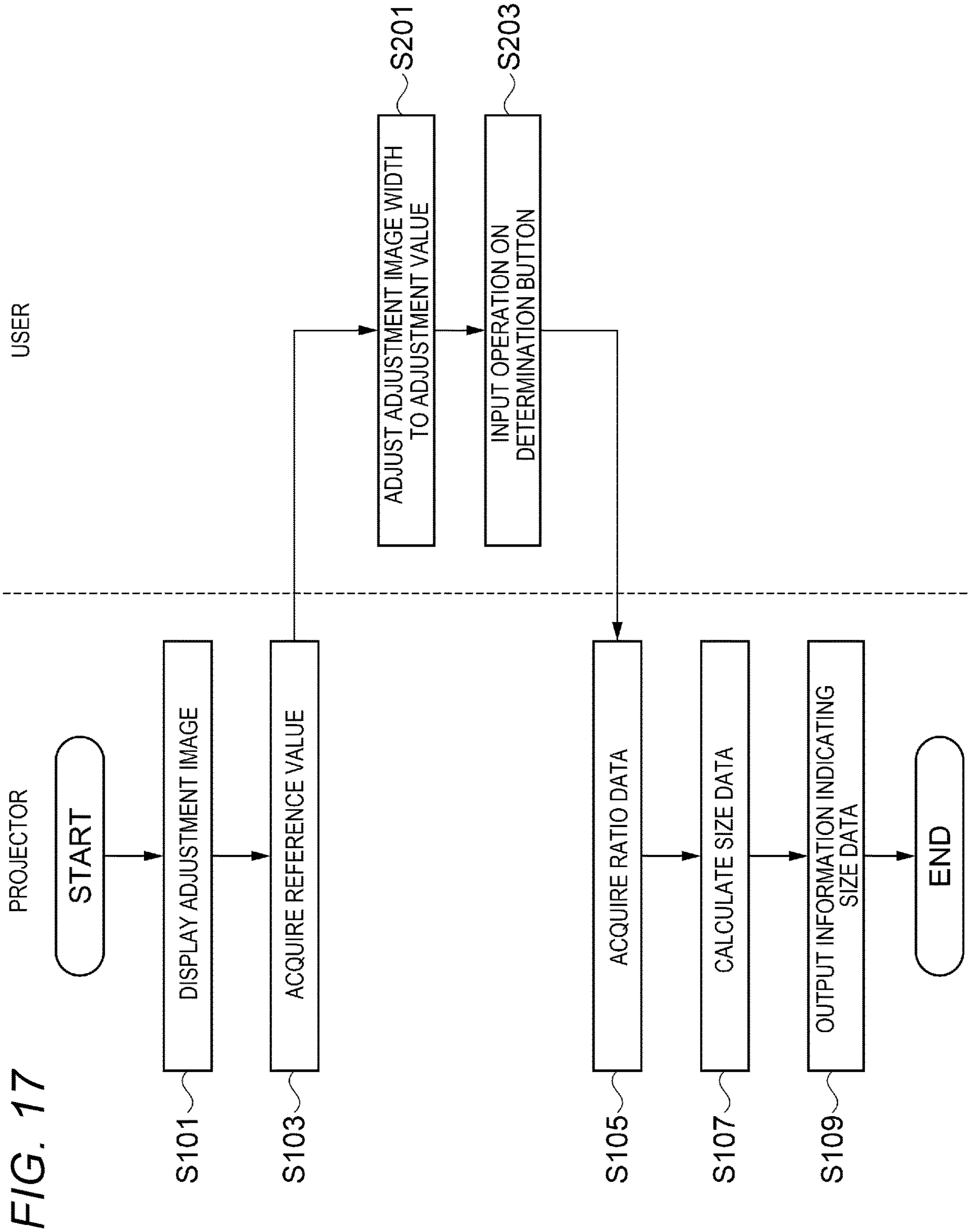
FIG. 17 is a diagram showing a control flow executed by the projector and a user.

FIG. 17 shows a control flow executed by the projector 1 and the user. The control flow executed by the projector 1 corresponds to an example of a control method for the projector 1. The control flow executed by the projector 1 is executed by the control device 5 causing the control program CP to operate.

In step S101, the projector 1 displays the adjustment image 101. The adjustment image 101 is included in the OSD image 100. The OSD image 100 is projected in the projection image PG. As an example, the projector 1 projects the first OSD image 100*a* including the first adjustment image 101*a* onto the projection surface SC.

When projecting the OSD image 100 onto the projection surface SC, the projector 1 acquires a reference value in step S103. The data processor 53 of the control device 5 reads the reference value stored in the memory 7 to thereby acquire the reference value. The reference value is a value relating to a size of the projection image PG such as the image width PW and the diagonal line length Y of the projection image PG. The reference value is a known value such as an actual size value of the exterior width 2W of the exterior housing 2. When the projector 1 projects the first OSD image 100*a* including the first adjustment image 101*a*, the data processor 53 acquires the actual size value of the exterior width 2W as the reference value.

After the projector 1 has projected the OSD image 100 onto the projection surface SC, in step S201, the user adjusts the adjustment image width AW of the adjustment image 101 to the adjustment value. When the projector 1 projects the first OSD image 100*a* onto the projection surface SC, the user adjusts the image adjustment width AW of the first adjustment image 101*a*. The user performs, using the remote controller 90, adjustment operation for enlarging or reducing the image adjustment width AW of the first adjustment image 101*a*. When the adjustment operation is performed, the remote controller 90 transmits an adjustment signal to the receiver 9. The OSD controller 51 receives the adjustment signal via the receiver 9. The OSD controller 51 enlarges or reduces the adjustment image width AW based on the adjustment signal. The user enlarges or reduces the adjustment image width AW to thereby match or substantially match the adjustment image width AW to the exterior width 2W. The adjustment image width AW is adjusted to the adjustment value. When the adjustment image width AW coincides or substantially coincides with the exterior width 2W, the adjustment value is the designated value assumed in advance.

After adjusting the adjustment image width AW to the adjustment value, in step S203, the user performs input operation on the determination button. The determination button is included in the plurality of operation buttons 91 provided in the remote controller 90. When the user performs the input operation on the determination button, the remote controller 90 transmits a determination signal to the receiver 9.

After the user has performed the input operation on the determination button, the projector 1 acquires ratio data in step S105. The OSD controller 51 receives the determination signal via the receiver 9. The OSD controller 51 acquires ratio data at the time when the adjustment image width AW of the first adjustment image 101*a* is adjusted to the adjustment value. As an example, the ratio data is a width ratio of the image width PW and the adjustment image width AW of the projection image PG. The OSD controller 51 enlarges or reduces the adjustment image width AW by fluctuating the ratio data. The OSD controller 51 acquires the ratio data at the time when the adjustment image width AW is adjusted to the adjustment value. The OSD controller 51 transmits the ratio data to the data processor 53.

After acquiring the ratio data, the projector 1 calculates size data in step S107. The data processor 53 calculates the size data based on the reference value and the ratio data. The ratio data is a value at the time when the adjustment image width AW of the adjustment image 101 is adjusted to the adjustment value. The size data is a value corresponding to a size of the projection image PG projected onto the projection surface SC. The size data is calculated using Expression (1).

After calculating the size data, in step S109, the projector 1 outputs information indicating the size data. The data processor 53 outputs the size data or data obtained by converting the size data to the outside as output data. The data processor 53 outputs the size data or the data to the OSD controller 51 and the image provision device 500. As an example, the OSD controller 51 adjusts the size of the OSD image 100 using the output data. The image provision device 500 corrects image data using the output data.

The control method for the projector 1 includes projecting the projection image PG including the adjustment image 101 onto the projection surface SC, acquiring a reference value relating to the image width PW on the projection surface SC, and outputting, based on the reference value, information indicating size data corresponding to the image width PW of the projection image PG projected onto the projection surface SC, the image width PW being a value at the time when the adjustment image width AW on the projection surface SC is adjusted to the adjustment value.

The projector 1 is capable of calculating a size of the projection image PG without using a distance measurement sensor.

The control program CP causes the projector 1 to execute projecting the projection image PG including the adjustment image 101 onto the projection surface SC, acquiring a reference value relating to the image width PW on the projection surface SC, and outputting, based on the reference value, information indicating size data corresponding to the image width PW of the projection image PG projected onto the projection surface SC, the image width PW being a value at the time when the adjustment image width AW of the adjustment image 101 on the projection surface SC is adjusted to the adjustment value.

The projector 1 is capable of calculating a size of the projection image PG without using a distance measurement sensor.

A summary of the present disclosure is noted below.

Note 1

A projector of the present disclosure includes an optical device and a processing device. The processing device executes: projecting a projection image including a first image onto a projection surface using the optical device; acquiring a first value relating to a first length of the first image on the projection surface; and outputting, based on the first value, information indicating a third value corresponding to a second length of the projection image projected onto the projection surface, the second length being a value at a time when the first length on the projection surface is adjusted to a second value.

The projector is capable of outputting the third value without using a distance measurement sensor.

Note 2

In the projector described in Note 1, the projector further includes an input device, the processing device receives, via the input device, first operation for enlarging or reducing the first image, and the outputting the information indicating the third value is outputting, based on the first value and an operation amount of the first operation until the second length is adjusted to the second value, the information indicating the third value.

A user performs the first operation, whereby the projector can output the third value.

Note 3

In the projector described in Note 1 or Note 2, the projector further includes a case that houses at least a part of the optical device and the processing device, the first value corresponds to a case length, which is length of at least a part of the case, and the projection image includes a second image for requesting a user to match the first length and the case length.

The user can grasp that the user should match the second length and the case length. The projector can output the third value.

Note 4

In the projector described in any one of Notes 1 to 3, when the projection image is horizontally equally divided into two, the first image is disposed in a region close to the case.

It is easy for a user to perform operation for adjusting the length of the first image.

Note 5

In the projector described in Note 2, the processing device executes: receiving, via the input device, second operation for changing a display position of the first image; and changing, based on the second operation, the display position of the first image in the projection image.

A user can change the display position of the first image. It is easy for the user to adjust the length of the first image.

Note 6

In the projector described in Note 2, the first length corresponds to a target object length, which is known length of a target object, and the projection image includes a third image for requesting, via the input device, a user to perform third operation for bringing the first length of the first image close to the target object length.

The user can cause the projector to output the third value using a target object, a size of which is known.

Note 7

In the projector described in any one of Notes 1 to 6, the outputting the information indicating the third value includes projecting a fourth image indicating the third value onto the projection surface using the optical device.

The user can recognize the third value by checking the fourth image.

Note 8

A control method for a projector of the present disclosure includes: projecting a projection image including a first image onto a projection surface; acquiring a first value relating to a first length of the first image on the projection surface; and outputting, based on the first value, a information indicating third value corresponding to a second length of the projection image projected onto the projection surface, the second length being a value at a time when the first length on the projection surface is adjusted to a second value.

The projector is capable of outputting the third value without using a distance measurement sensor.

Note 9

A non-transitory computer-readable storage medium storing a program, the program causing a projector to execute: projecting a projection image including a first image onto a projection surface; acquiring a first value relating to a first length of the first image on the projection surface; and outputting, based on the first value, information indicating a third value corresponding to a second length of the projection image projected onto the projection surface, the second length being a value at a time when the first length on the projection surface is adjusted to a second value.

The projector is capable of outputting the third value without using a distance measurement sensor.

What is claimed is:

1. A projector comprising:

an optical device; and a processing device, the processing device executing:

projecting a projection image including a first image onto a projection surface using the optical device;

acquiring a first value relating to a first length of the first image on the projection surface;

outputting, based on the first value, information indicating a third value corresponding to a second length of the projection image projected onto the projection surface, the second length being a value at a time when the first length on the projection surface is adjusted to a second value; and wherein:

the processing device receives, via an input device, first operation for enlarging or reducing the first image, and the outputting the information indicating the third value is outputting, based on the first value and an operation amount of the first operation until the second length is adjusted to the second value, the information indicating the third value.

2. The projector according to claim 1, further comprising a case that houses at least a part of the optical device and the processing device, wherein the first value corresponds to a case length, which is length of at least a part of the case, and the projection image includes a second image for requesting a user to match the first length and the case length.

3. The projector according to claim 2, wherein, when the projection image is horizontally equally divided into two, the first image is disposed in a region close to the case.

4. The projector according to claim 1, wherein the processing device executes:

receiving, via the input device, second operation for changing a display position of the first image; and changing, based on the second operation, the display position of the first image in the projection image.

5. The projector according to claim 1, wherein the first length corresponds to a target object length, which is known length of a target object, and the projection image includes a third image for requesting, via the input device, a user to perform third operation for bringing the first length of the first image close to the target object length.

6. The projector according to claim 1, wherein the outputting the information indicating the third value includes projecting a fourth image indicating the third value onto the projection surface using the optical device.

7. A control method for a projector comprising:

projecting a projection image including a first image onto a projection surface;

acquiring a first value relating to a first length of the first image on the projection surface;

outputting, based on the first value, information indicating a third value corresponding to a second length of the projection image projected onto the projection surface, the second length being a value at a time when the first length on the projection surface is adjusted to a second value; and receiving, via an input device, a first operation for enlarging or reducing the first image;

wherein the outputting the information indicating the third value is outputting, based on the first value and an operation amount of the first operation until the second length is adjusted to the second value, the information indicating the third value.

8. A non-transitory computer-readable storage medium storing a program, the program causing a projector to execute:

projecting a projection image including a first image onto a projection surface;

acquiring a first value relating to a first length of the first image on the projection surface;

outputting, based on the first value, information indicating a third value corresponding to a second length of the projection image projected onto the projection surface, the second length being a value at a time when the first length on the projection surface is adjusted to a second value; and receiving, via an input device, a first operation for enlarging or reducing the first image;

wherein the outputting the information indicating the third value is outputting, based on the first value and an operation amount of the first operation until the second length is adjusted to the second value, the information indicating the third value.

9. The control method according to claim 7, further comprising:

receiving, via the input device, a second operation for changing a display position of the first image; and changing, based on the second operation, the display position of the first image in the projection image.

10. The control method according to claim 7, wherein the first length corresponds to a target object length, which is known length of a target object, and the projection image includes a third image for requesting, via the input device, a user to perform third operation for bringing the first length of the first image close to the target object length.

11. The control method according to claim 7, wherein the outputting the information indicating the third value includes projecting a fourth image indicating the third value onto the projection surface using an optical device.

12. The control method according to claim 7, wherein the first value corresponds to a remote controller length of a remote controller configured to operate the projector, and the projection image includes a second image for requesting a user to match the first length and the remote controller length.

13. The control method according to claim 12, wherein a width of the first image is greater than a height of the first image, and the width of the first image extends along a width of the projection image.

14. The non-transitory computer-readable storage medium according to claim 8, wherein the program further causes the projector to execute:

receiving, via the input device, a second operation for changing a display position of the first image; and changing, based on the second operation, the display position of the first image in the projection image.

15. The non-transitory computer-readable storage medium according to claim 8, wherein:

the first length corresponds to a target object length, which is known length of a target object, and the projection image includes a third image for requesting, via the input device, a user to perform third operation for bringing the first length of the first image close to the target object length.

16. The non-transitory computer-readable storage medium according to claim 8, wherein the outputting the information indicating the third value includes projecting a fourth image indicating the third value onto the projection surface using an optical device.

17. The non-transitory computer-readable storage medium according to claim 8, wherein:

the first value corresponds to a remote controller length of a remote controller configured to operate the projector, and the projection image includes a second image for requesting a user to match the first length and the remote controller length.

18. The non-transitory computer-readable storage medium according to claim 17, wherein:

a width of the first image is greater than a height of the first image, and the width of the first image extends along a width of the projection image.

19. The projector according to claim 1, wherein:

the first value corresponds to a remote controller length of a remote controller configured to operate the projector, and the projection image includes a second image for requesting a user to match the first length and the remote controller length.

20. The projector according to claim 19, wherein:

a width of the first image is greater than a height of the first image, and the width of the first image extends along a width of the projection image.

* * * * *